United States Patent
Yang et al.

(10) Patent No.: US 12,356,214 B2
(45) Date of Patent: Jul. 8, 2025

(54) INFORMATION REPORTING METHOD, ACCESS MANNER DETERMINING METHOD, TERMINAL, AND NETWORK DEVICE

(71) Applicant: VIVO MOBILE COMMUNICATION CO., LTD., Guangdong (CN)

(72) Inventors: Kun Yang, Guangdong (CN); Dajie Jiang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 520 days.

(21) Appl. No.: 17/893,392

(22) Filed: Aug. 23, 2022

(65) Prior Publication Data

US 2022/0408277 A1    Dec. 22, 2022

Related U.S. Application Data

(63) Continuation of application No. PCT/CN2021/078848, filed on Mar. 3, 2021.

(30) Foreign Application Priority Data

Mar. 9, 2020    (CN) .......................... 202010158943.2

(51) Int. Cl.
  *H04L 5/00*      (2006.01)
  *H04W 16/28*   (2009.01)
  *H04W 24/10*   (2009.01)

(52) U.S. Cl.
  CPC ........... *H04W 16/28* (2013.01); *H04L 5/0051* (2013.01); *H04W 24/10* (2013.01)

(58) Field of Classification Search
  None
  See application file for complete search history.

(56) References Cited

U.S. PATENT DOCUMENTS

2018/0287683 A1    10/2018    Subramanian et al.
2020/0119821 A1    4/2020    Qin et al.
(Continued)

FOREIGN PATENT DOCUMENTS

CN    106304120 A    1/2017
CN    109150338 A    1/2019
(Continued)

OTHER PUBLICATIONS

Mediatek Inc., "Maintenance for Beam Management", 3GPP TSG RAN WG1 Meeting #95 , R1-1812345, Spokane, US, Nov. 12-16, 2018.

(Continued)

*Primary Examiner* — Jenkey Van
(74) *Attorney, Agent, or Firm* — Price Heneveld LLP

(57) ABSTRACT

Disclosed are information reporting method, access manner determining method, terminal, and network device. The method includes: performing measurement on part or all of M beams, where N beams in the M beams are beams generated by a network device based on a same transmit spatial filter; and reporting first information to the network device based on measurement results of part or all of the M beams, where the first information includes at least one of the following: a target measurement result and access state information; where the target measurement result is a measurement result determined based on the measurement results of part or all of the M beams, and the access state information is information that is for indicating an access manner of accessing the network device by the terminal and that is determined based on the measurement results of part or all of the M beams.

20 Claims, 9 Drawing Sheets

(56) References Cited

U.S. PATENT DOCUMENTS

| | | | |
|---|---|---|---|
| 2020/0120531 A1* | 4/2020 | Qin | H04B 7/0695 |
| 2020/0177265 A1* | 6/2020 | Guan | H04B 7/088 |
| 2020/0267567 A1 | 8/2020 | Chang et al. | |
| 2021/0175937 A1 | 6/2021 | Yamada et al. | |
| 2021/0258064 A1 | 8/2021 | Yu et al. | |
| 2021/0306996 A1 | 9/2021 | Matsumura et al. | |

FOREIGN PATENT DOCUMENTS

| | | | |
|---|---|---|---|
| CN | 110661556 A | 1/2020 | |
| CN | 110753388 A | 2/2020 | |
| JP | 2020005127 A | 1/2020 | |
| WO | 2018197436 A1 | 11/2018 | |
| WO | 2019054575 A1 | 3/2019 | |
| WO | 2019074761 A1 | 4/2019 | |
| WO | 2019140598 A1 | 7/2019 | |
| WO | 2020012661 A1 | 1/2020 | |

OTHER PUBLICATIONS

Mediatek Inc., "Link recovery maintanance", 3GPP TSG RAN WG1 Meeting #95, R1-1812345, Spokane, US, Nov. 12-16, 2018.

Ashrafuz Zaman, Lars Manholm, and Anders Demeryd, Dual Beam Phased Array Antenna with Wide Scan Angle For Repeater Applications, Department of Electrical & Electronic Engineering, Chittagong University of Engineering & Technology (CUET), Chittagong-4349, Bangladesh, Ericsson AB, Ericsson Research, SE-417 56 Goteborg, Sweden, 5th International Conference on Electrical and Computer Engineering, ICECE 2008, Dec. 20-22, 2008, Dhaka, Bangladesh.

ZTE, Discussion on DL beam management, 3GPP TSG RAN WG1 Meeting #89, R1-1707119, May 15-19, 2017, Hangzhou, P.R. China.

"PDSCH default QCL assumption in cross-carrier scheduling case", 3GPP TSG RAN WG1 Meeting #95, R1-1812345, Spokane, US, Nov. 12-16, 2018.

* cited by examiner

INFORMATION REPORTING METHOD, ACCESS MANNER DETERMINING METHOD, TERMINAL, AND NETWORK DEVICE

CROSS-REFERENCE TO RELATED APPLICATIONS

This application is continuation application of PCT International Application No. PCT/CN2021/078848 filed on Mar. 3, 2021, which claims priority to Chinese Patent Application No. 202010158943.2 filed in China on Mar. 9, 2020. The entire contents of each of the above-referenced applications are expressly incorporated herein by reference.

TECHNICAL FIELD

The present invention relates to the field of communications technologies, and in particular, to an information reporting method, an access manner determining method, a terminal, and a network device.

BACKGROUND

In radio communication, due to deployment of network devices (for example, base stations) or change of transmission environments, a radio network may have coverage holes. Therefore, in some communications systems (for example, a 5G system), some nodes are deployed to transmit signals of a network device, so that the network device can transmit beams by pointing to the nodes and then the nodes forward the beams to the terminal, so as to implement communication between the network device and the terminal, achieving the purposes of coverage expansion and coverage hole filling. The nodes are implemented as, for example, large intelligent surface (LIS) nodes, or layer-1 relays having a beam forwarding function, amplify-and-forward relays, or transparent forward relays. However, in practical applications, although a terminal may support a plurality of access manners for accessing a network device, currently the network device cannot determine an access manner for accessing the network device by the terminal.

SUMMARY

According to a first aspect, an embodiment of the present invention provides an information reporting method, applied to a terminal and including:
  performing measurement on part or all of M beams, where N beams in the M beams are beams generated by a network device based on a same transmit spatial filter, M and N are integers greater than 1, and N is less than or equal to M; and
  reporting first information to the network device based on measurement results of part or all of the M beams, where the first information includes at least one of the following:
  a target measurement result and access state information; where
  the target measurement result is: a measurement result determined based on the measurement results of part or all of the M beams, and the access state information is information that is for indicating an access manner of accessing the network device by the terminal and that is determined based on the measurement results of part or all of the M beams; and
  the access manner is directly accessing the network device by the terminal or indirectly accessing the network device by the terminal.

According to a second aspect, an embodiment of the present invention provides an access manner determining method, applied to a network device and including:
  obtaining first information, where the first information includes: at least one of a target measurement result and access state information; and
  determining, based on the first information, an access manner for accessing the network device by a terminal, where
  the target measurement result is: a measurement result determined based on the measurement results of part or all of the M beams, and the access state information is information that is for indicating an access manner of accessing the network device by the terminal and that is determined based on the measurement results of part or all of the M beams; and N beams in the M beams are beams generated by the network device based on a same transmit spatial filter, M and N are integers greater than 1, and N is less than or equal to M; and
  the access manner is directly accessing the network device by the terminal or indirectly accessing the network device by the terminal.

According to a third aspect, an embodiment of the present invention provides an access manner determining method, applied to a network device and including:
  performing measurement on part or all of M beams, where N beams in the M beams are beams generated by the network device based on a same receive spatial filter, M and N are integers greater than 1, and N is less than or equal to M; and
  determining, based on measurement results of part or all of the M beams, an access manner for accessing the network device by a terminal; where
  the access manner is directly accessing the network device by the terminal or indirectly accessing the network device by the terminal.

According to a fourth aspect, an embodiment of the present invention provides a terminal, including:
  a first measurement module, configured to perform measurement on part or all of M beams, where N beams in the M beams are beams generated by a network device based on a same transmit spatial filter, M and N are integers greater than 1, and N is less than or equal to M; and
  a reporting module, configured to report first information to the network device based on measurement results of part or all of the M beams, where the first information includes at least one of the following:
  a target measurement result and access state information; where
  the target measurement result is: a measurement result determined based on the measurement results of part or all of the M beams, and the access state information is information that is for indicating an access manner of accessing the network device by the terminal and that is determined based on the measurement results of part or all of the M beams; and
  the access manner is directly accessing the network device by the terminal or indirectly accessing the network device by the terminal.

According to a fifth aspect, an embodiment of the present invention provides a network device, including:

an obtaining module, configured to obtain first information, where the first information includes: at least one of a target measurement result and access state information; and a determining module, configured to determine, based on the first information, an access manner for accessing the network device by a terminal, where the target measurement result is: a measurement result determined based on the measurement results of part or all of the M beams, and the access state information is information that is for indicating an access manner of accessing the network device by the terminal and that is determined based on the measurement results of part or all of the M beams; and N beams in the M beams are beams generated by the network device based on a same transmit spatial filter, M and N are integers greater than 1, and N is less than or equal to M; and the access manner is directly accessing the network device by the terminal or indirectly accessing the network device by the terminal.

According to a sixth aspect, an embodiment of the present invention provides a network device, including:

a measurement module, configured to perform measurement on part or all of M beams, where N beams in the M beams are beams generated by the network device based on a same receive spatial filter, M and N are integers greater than 1, and N is less than or equal to M; and a determining module, configured to determine, based on measurement results of part or all of the M beams, an access manner for accessing the network device by a terminal; where the access manner is directly accessing the network device by the terminal or indirectly accessing the network device by the terminal.

According to a seventh aspect, an embodiment of the present invention provides a terminal, including a memory, a processor, and a program stored in the memory and capable of running on the processor, where when the program is executed by the processor, the steps of the foregoing information reporting method provided in the embodiments of the present invention are implemented.

According to an eighth aspect, an embodiment of the present invention provides a network device, including a memory, a processor, and a program stored in the memory and capable of running on the processor, where when the program is executed by the processor, the steps of the access manner determining method according to the second aspect are implemented, or when the program is executed by the processor, the steps of the access manner determining method according to the third aspect are implemented.

According to a ninth aspect, an embodiment of the present invention provides a computer-readable storage medium, where a computer program is stored in the computer-readable storage medium, and when the computer program is executed by a processor, the steps of the access manner determining method according to the second aspect are implemented, or when the computer program is executed by a processor, the steps of the access manner determining method according to the third aspect are implemented.

DETAILED DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention shall fall within the protection scope of the present invention.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of the present invention, the terms "an example" or "for example" are used to represent an example, an illustration, or a description. Any embodiment or design scheme described as "an example" or "for example" in the embodiments of the present invention should not be construed as being more preferred or advantageous than other embodiments or design schemes. To be precise, the words such as "an example" or "for example" are intended to present a related concept in a specific manner.

The following describes the embodiments of the present invention with reference to the accompanying drawings. An information reporting method, an access manner determining method, terminal, and network device provided in the embodiments of the present invention may be applied to a wireless communications system, where the wireless communications system may be a new radio (NR) system or other systems, such as an evolved long term evolution (eLTE) system, a long term evolution (LTE) system, or a later evolved communications system; and further, may be applied to unlicensed bands in the wireless communication system.

Figure 1:
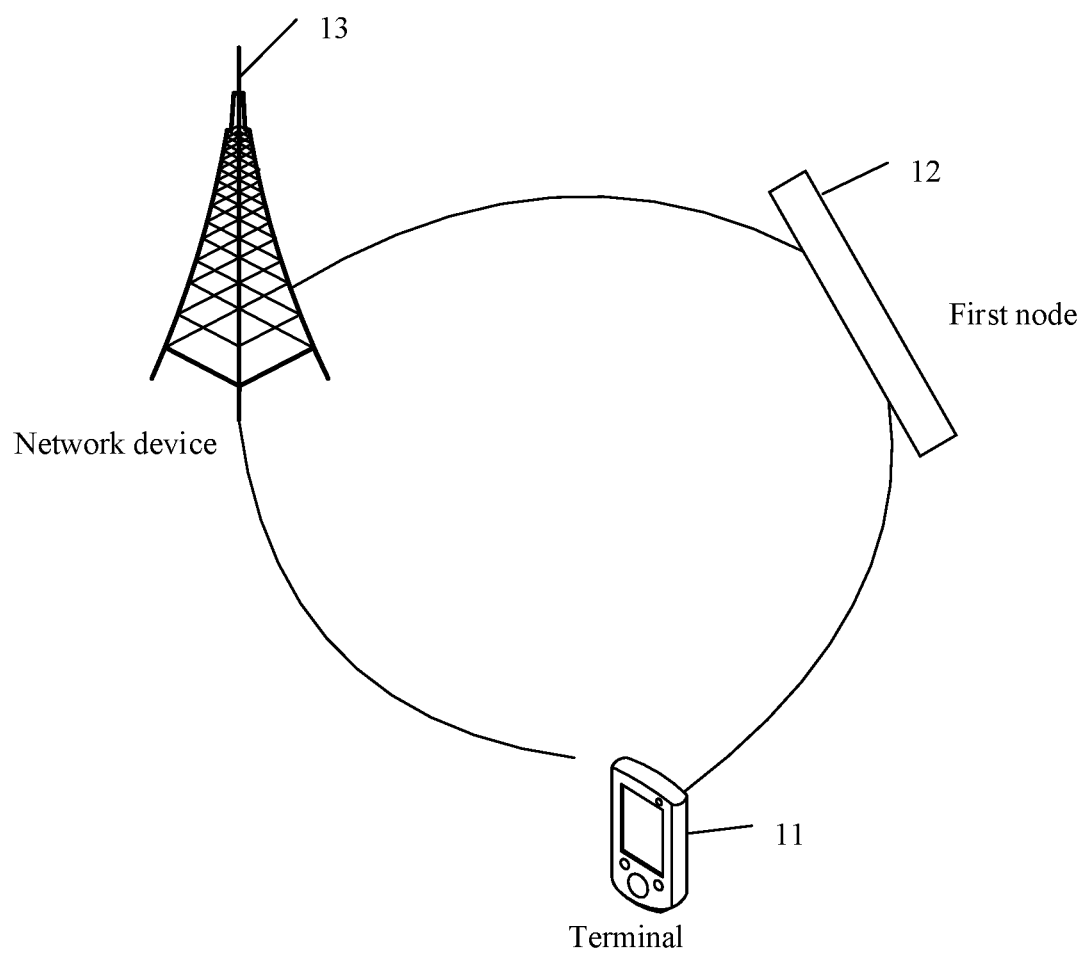
FIG. 1 is a structural diagram of a network system to which the embodiments of the present invention are applicable.

Referring to FIG. 1, FIG. 1 is a structural diagram of a network system to which an embodiment of the present invention may be applied. As shown in FIG. 1, the network system includes a terminal 11, a first node 12, and a network device 13. The terminal 11 may be a user terminal (UE) or another terminal-side device, for example, a mobile phone, a tablet personal computer, a laptop computer, a personal digital assistant (PDA), a mobile Internet device (MID), a wearable device, or a robot. It should be noted that a specific type of the terminal 11 is not limited in this embodiment of the present invention. The first node 12 may be a node or device capable of transmitting signals between a network device and a terminal, for example, a large intelligent surface (LIS) node, a metasurface node, an intelligent transmit surface node, a layer-1 relay with a beam forwarding function, an amplify-and-forward relay, or a transparent forward relay. The network device 13 may be a 4G base station, a 5G base station, or a base station of a later version, or a base station in another communications system, or is referred to as a NodeB, or an evolved NodeB, or a transmission and reception point (Transmission Reception Point, TRP), or an access point (AP), or other terms in the art. Provided that a same technical effect is achieved, the network device is not limited to a specific technical term. In addition, the network device 13 may be a master node (MN) or a secondary node (SN). It should be noted that the 5G base station is used merely as an example in this embodiment of the present invention, rather than limiting a specific type of the network device.

In this embodiment of the present invention, the terminal 11 may directly communicate with the network device 13, or may communicate with the network device 12 through the first node 12. The first node 12 may send an uplink signal of the terminal to the network device, or may send a downlink signal of the network device to the terminal. Sending by the first node may be direct forwarding, transparent forwarding, amplification and forwarding, or frequency conversion or modulation on the signal and then transmission, which is not limited herein.

The first node may be implemented as, for example, a large intelligent surface (LIS) node, a metasurface node, an intelligent transmit surface node, a layer-1 relay with a beam forwarding function, an amplify-and-forward relay, or a transparent forward relay. The LIS node is an emerging artificial material device. The LIS node is capable of dynamically or semi-statically adjusting its own electromagnetic properties to affect reflection or refraction behavior of electromagnetic waves incident on the LIS node. The LIS node may manipulate a reflected wave or a refracted signal of an electromagnetic signal to implement functions such as beam sweeping or beamforming.

Figure 2:
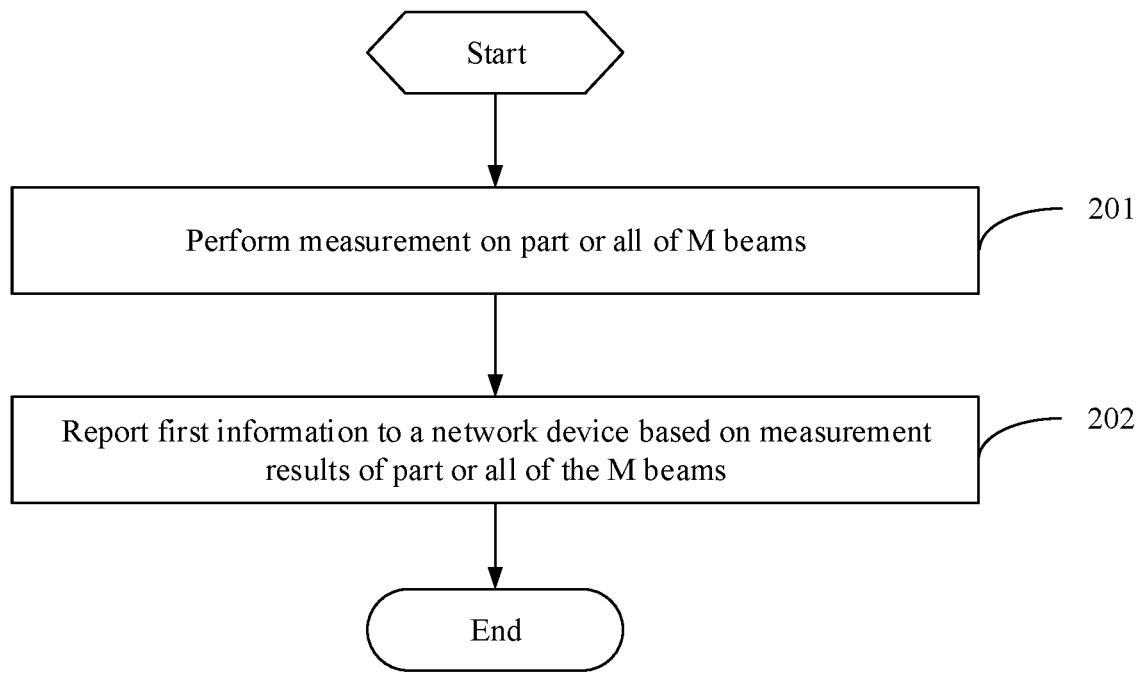
FIG. 2 is a flowchart of an information reporting method according to an embodiment of the present invention.

Referring to FIG. 2, FIG. 2 is a flowchart of an information reporting method according to an embodiment of the present invention. The method is applied to a terminal, and as shown in FIG. 2, includes the following steps.

Step 201: Perform measurement on part or all of M beams.

The M beams may be beams for channel measurement that are configured for the terminal by a network device.

N beams in the M beams are beams generated by the network device based on a same transmit spatial filter (spatial domain transmission filter), M and N are integers greater than 1, and N is less than or equal to M. It should be understood that, in the channel measurement process, channel measurement on one beam is performed by using a reference signal associated with the beam, for example, synchronization signal block (SSB), channel state indication reference signal (CSI-RS), or demodulation reference signal (DMRS), to obtain a measurement result.

The M beams are multiple beams measurable for the terminal. In addition to the N beams, the M beams may or may not include other beams, for example, may further include beams generated by other spatial filters. Measurement on part or all of the M beams may be measurement on the N beams, or measurement on each of the M beams.

Figure 3:
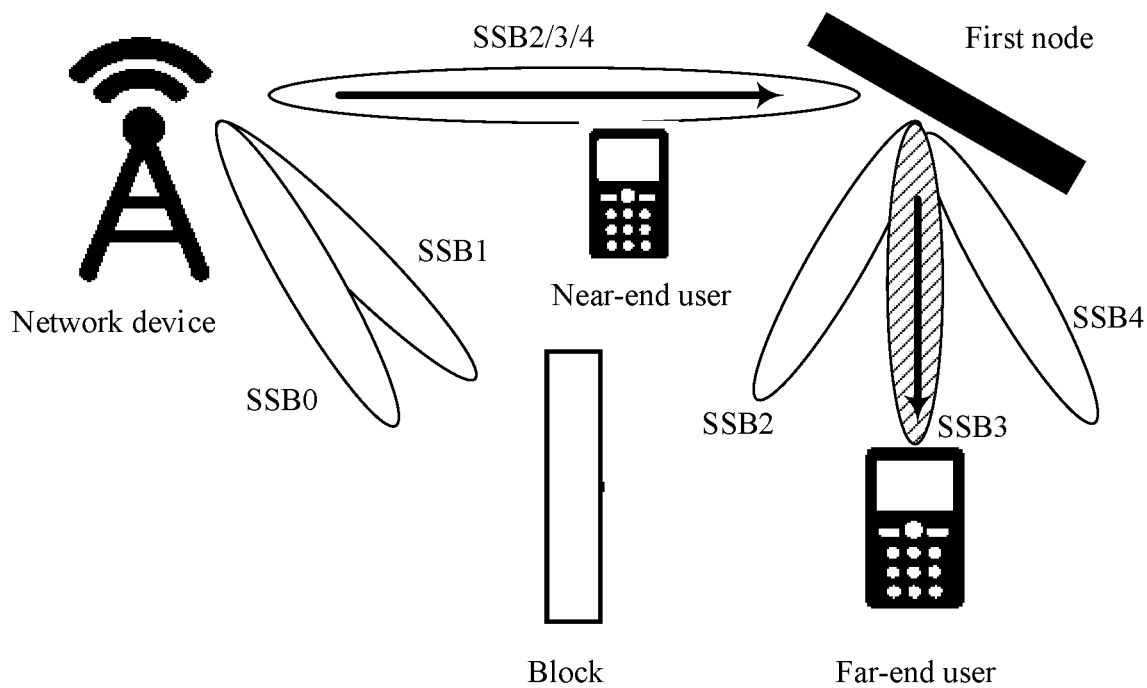
FIG. 3 is a schematic diagram of an application scenario according to an embodiment of the present invention.

The N beams may be N beams generated at different times based on a same transmit spatial filter. For example, as shown in FIG. 3, there is one beam direction in which the network device is directed to a first node, and the N beams may be N beams with different time resources in the beam direction. For example, three beams for synchronization signal block (SSB) 2, SSB3, and SSB4 are sent on different time resources, that is, the three beams transmit the SSB2, SSB3 and SSB4 on different time resources.

In addition, signals of the N beams may be radiated to the first node during spatial propagation.

Further, in this embodiment of the present invention, the signals sent by the N beams may be forwarded or not forwarded by beams of the first node. For example, as shown in FIG. 3, the first node transmits the SSB2, SSB3, and SSB4 by using different beams. When the terminal is a near-end user, the terminal may directly receive an SSB transmitted by the network device, and when the terminal is a far-end user, the terminal may receive an SSB through the first node. It should be noted that FIG. 3 is merely an example schematic diagram. For example, signals of part of the N beams may alternatively be forwarded by using a same beam of the first node.

FIG. 3 illustrates that all the N beams are forwarded by the first node. In practical applications, the N beams may include beams whose signals are forwarded by the first node and beams whose signals are not forwarded by the first node. For example, a quantity of beam resources of the first node is less than N, or a quantity of resources of the N beams may be greater than that of resources of forwarding beams of the first node, that is, beams of the network device that are directed to the first node may not be forwarded by the first node.

The performing measurement on M beams, so that the terminal obtains measurement results of the M beams may be performing measurement on transmit signals of the M beams to obtain the measurement results of the M beams. The performing measurement on transmit signals of the M beams includes: performing measurement on signals that are sent by the network device and forwarded by the beams of the first node. For example, a signal sent by the network device by using a beam n is transmitted to the terminal through a beam of the first node. In this case, a measurement result obtained by the terminal by measuring the signal transmitted by the first node is a measurement result of the beam n by the terminal. Certainly, measurement on the signals sent by the M beams includes measurement on those directly sent by the beams of the network device to the terminal.

In addition, the signal may be a reference signal. For example, measurement is performed on reference signals associated with the M beams to obtain the measurement results of the M beams. The reference signals include but are not limited to SSB, channel state indication reference signal (CSI-RS), or demodulation reference signal (DMRS).

Further, because the N beams are beams generated by the network device based on the same transmit spatial filter, reference signals sent on the N beams use a same spatial filter configuration (spatial domain transmission filter), or reference signals sent on the N beams have a quasi co-location (QCL) relationship on a network-device side.

It should be noted that although the N beams are beams generated by the network device based on the same transmit spatial filter, the N beams may have a QCL relationship or may not have a QCL relationship on the terminal side due to influence of transmission environments, the first node, and the like. Therefore, the N beams may be referred to as beams that possibly have a QCL relationship.

Step 202: Report first information to the network device based on measurement results of part or all of the M beams, where the first information includes at least one of the following:

a target measurement result and access state information; where the target measurement result is: a measurement result determined based on the measurement results of part or all of the M beams, and the access state information is information that is for indicating an access manner of accessing the network device by the terminal and that is determined based on the measurement results of part or all of the M beams; and the access manner is directly accessing the network device by the terminal or indirectly accessing the network device by the terminal.

The measurement results of part or all of the M beams may be measurement results of all the M beams or measurement results of the N beams. Indirectly accessing the network device by the terminal may be accessing the network device through the first node, where the first node is used to forward signals of the network device, and the signals of the network device include signals sent to the network device and signals sent by the network device.

The measurement results of the M beams include at least one of the following: signal quality of the M beams and a channel correlation between the M beams.

The reporting first information to the network device based on measurement results of part or all of the M beams may be: determining the first information based on the measurement results of part or all of the M beams, and then reporting the first information to the network device. The reporting the first information may be directly reporting to the network device, or reporting to the network device through the first node.

The target measurement result may include the measurement results of part or all of the M beams.

It should be noted that, in a case that measurement is performed on part of the M beams in step 201, the measurement results used in step 202 may be measurement results of all or part of beams in the part of beams measured in step 201; and in a case that measurement is performed on all the M beams in step 201, the measurement results used in step 202 may be measurement results of part or all of beams in the M beams measured in step 201.

In this embodiment of the present invention, with the foregoing steps, the terminal can report the first information to the network device, so that the network device can determine the access manner for accessing the network device by the terminal, further helping improve communication quality between the network device and the terminal. For example, the network device can determine the access manner of the terminal, and then use a transmission mode of the access manner to communicate with the terminal, thereby improving communication quality between the network device and the terminal; or the network device can determine, based on the target measurement result, the access manner of the terminal or signal quality of the terminal relative to the beam, so that the network device communicates with the terminal in a corresponding mode. Further, the network device can further properly schedule resources based on the access manner of the terminal, for example, allocating time-frequency resources or determining a corresponding beamforming scheme, so as to improve scheduling effects.

In an optional implementation, the target measurement result includes at least one of the following:

signal quality measurement results of the N beams and a channel correlation measurement result between the N beams.

The signal quality measurement results of the N beams may be a combined measurement result of the signal quality measurement results of the N beams, or signal quality measurement results of all or part of the N beams.

In this implementation, at least one of the signal quality measurement results of the N beams and the channel correlation measurement result between the N beams is reported, so that the network device can determine the access manner of the terminal based on the measurement results, and determine signal quality and channel correlation of these beams relative to the terminal.

In an optional implementation, before measurement is performed on the M beams to obtain the measurement results of the M beams, the method further includes:

receiving configuration information, where the configuration information is used to indicate that the N beams are beams generated by the same transmit spatial filter.

The configuration information may be sent by using a system information block (SIB), radio resource control (RRC) signaling, or the like.

The indicating that the N beams are beams generated by the same transmit spatial filter may be implicitly or explicitly indicating that the N beams are beams generated by the same transmit spatial filter.

In one manner, the configuration information indicates that N reference signals are reference signals with a QCL relationship, so as to implicitly indicate that the N beams are generated by the same transmit spatial filter, and the N beams are beams for sending the N reference signals.

The N reference signals may be N reference signals of a same type, for example, N SSBs, N CSI-RSs, or N DMRSs, which are certainly not limited; or may be N reference signals of different types.

It should be noted that all or part of the N reference signals may be transmitted to the terminal through the first node. When part of the reference signals are transmitted to the terminal through the first node, the other part of the reference signals are directly transmitted by the network device to the terminal. In a case of transmission to the terminal through the first node, different beams of the first node transmit different reference signals. For example, as shown in FIG. 3, the first node transmits the SSB2, SSB3 and SSB4 by using different beams, and further the SSB2, SSB3 and SSB4 are transmitted to the first node by using a same beam by the network device. When the terminal is a near-end user, the terminal may directly receive an SSB transmitted by the network device, and when the terminal is a far-end user, the terminal may receive an SSB through the first node. It should be noted that FIG. 3 is merely an example schematic diagram.

In addition, an association relationship between reference signals and beams may be dynamically indicated to the terminal, preconfigured for the terminal, or the like.

In another manner, the configuration information indicates a working time of forwarding a beam by a first node, so as to implicitly indicate that the N beams are generated by the same transmit spatial filter and the N beams are beams of the network device that work during the working time, where the first node is a node for forwarding related signals of the network device.

Figure 4:
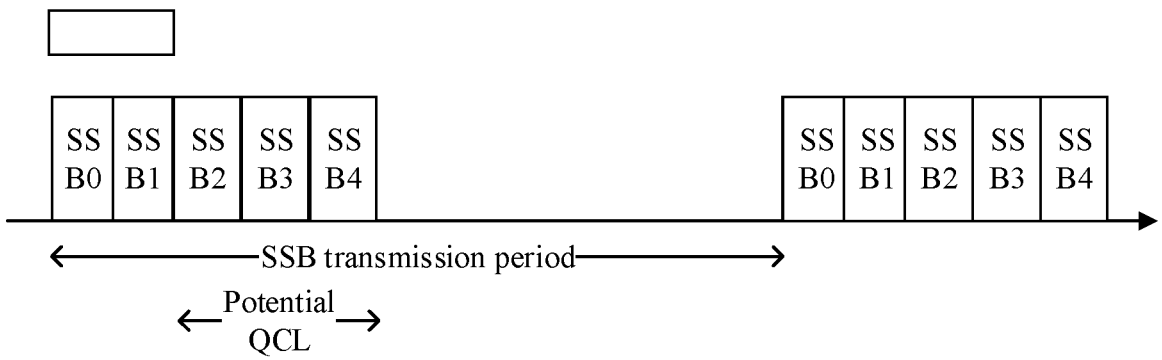
FIG. 4 is a schematic diagram of a working periodicity of a LIS node according to an embodiment of the present invention.

As shown in FIG. 4, using the first node being a LIS node and the reference signal being an SSB as an example, the LIS node is turned off at a time of sending the SSB0 and SSB1, and is working at a time of sending the SSB2, SSB3, and SSB4. Therefore, it is determined that the three beams for sending the SSB2, SSB3 and SSB4 are assumed to be generated by the same transmit spatial filter, that is, the three beams possibly have a QCL relationship.

Figure 5:
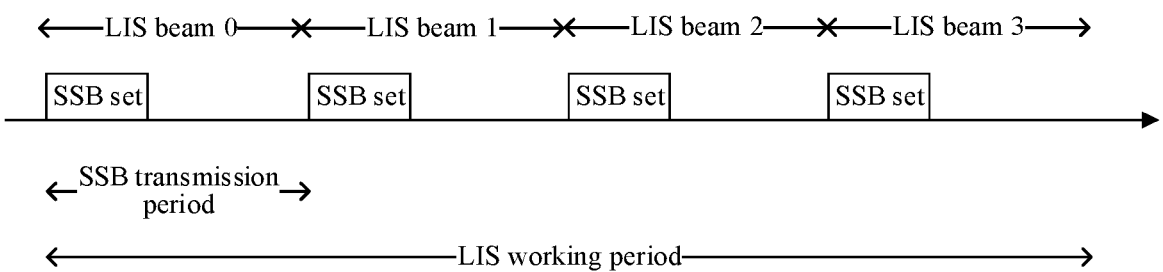
FIG. 5 is a schematic diagram of a working periodicity of another LIS node according to an embodiment of the present invention.

It should be noted that, in this embodiment of the present invention, a beam period of the first node may be one SSB transmission period, or may be a plurality of consecutive SSB transmission periods. As shown in FIG. 5, a working period of the LIS node corresponds to a plurality of SSB transmission periods, and LIS beams in FIG. 5 are forwarding beams of the LIS node. A time of each forwarding beam of the LIS node is an SSB transmission period. Due to influence of the LIS node, SSBs with a same index in the plurality of consecutive SSB periods may or may not have a QCL relationship.

It should be noted that the configuration information is described only by using an example. In this embodiment of the present invention, the network device may configure parameters of beam measurement for the terminal by using the configuration information, and may also configure reference signals corresponding to the forwarding beams of the first node, for example, SSBs, CSI-RSs, and DMRSs. If there are a plurality of first nodes in a cell, configuration of the first nodes may be indicated based on grouping of the first nodes.

In addition, in this embodiment of the present invention, in addition to implicit indication, indication may alternatively be performed directly by using signaling.

In an optional implementation, the reporting first information to the network device based on measurement results of part or all of the M beams includes:
 determining, based on measurement results of the N beams, whether the N beams have a quasi co-location QCL relationship; and
 reporting the first information to the network device based on whether the N beams have a QCL relationship.

The determining, based on measurement results of the N beams, whether the N beams have a quasi co-location QCL relationship may be determining, based on the signal quality measurement results and/or the channel correlation measurement result of the N beams, whether the N beams have a QCL relationship.

In one manner, in a case that measurement results of the N beams include signal quality measurement results of the N beams, if a difference between the signal quality measurement results of the N beams satisfies a first condition, the N beams have a QCL relationship.

The difference between the signal quality measurement results of the N beams satisfying the first condition may be that the difference between the signal quality measurement results of the N beams is relatively small, indicating that the terminal can directly access the network device (that is, a near-end user); otherwise, it indicates that the terminal accesses the network device through the first node (that is, a far-end user).

Optionally, the difference between the signal quality measurement results of the N beams satisfying the first condition means:
 a difference between a signal quality measurement result of a first beam in the N beams and a signal quality reference result is less than or equal to a second threshold, where the first beam is any beam with a signal quality measurement result in the N beams, and the signal quality reference result is a calculation result of the signal quality measurement results of the N beams, for example, an average value or a weighted average value; or
 an absolute difference between a signal quality measurement result of a second beam in the N beams and a signal quality measurement result of a first beam is less than or equal to a third threshold, where the first beam is any beam with a signal quality measurement result in the N beams, the second beam is a beam whose signal is not affected by a first node in the N beams, and the first node is a node for forwarding related signals of the network device.

For example, the N beams are $\{B_i\}$, i=1, ... n, whose signal quality measurement results are $\{Q_i\}$, i=1, ... n, indicating signal quality measurement results of the beam $B_i$. The signal quality reference result is an average signal quality $Q_{mean}=\text{mean}\{Q_i\}$ If beam signal quality of any beam and the average signal quality are greater than a second threshold $\Delta$, it is considered that there is no QCL relationship, or it is directly determined that the terminal accesses the cell through the first node. If the beam signal quality of any beam and the average signal quality are less than or equal to the second threshold $\Delta$, it is considered that there is a QCL relationship, or it is directly determined that the terminal directly accesses the network device. That is, in this embodiment of the present invention, determining presence of the QCL relationship may be skipped, and the access manner for accessing the network device by the terminal may be directly determined. For example: if the difference between the signal quality measurement results of the N beams satisfies the first condition, it is determined that the terminal directly accesses the network device; otherwise, it is determined that the terminal accesses the network device through the first node. Alternatively, if the channel correlation between the N beams is greater than the first threshold, it is determined that the terminal directly accesses the network device; otherwise, it is determined that the terminal accesses the network device through the first node.

For another example, a quantity of beam resources of the network device that are directed to the first node are greater than that of forwarding beam resources of the first node, that is, at least one beam resource in the N beams is not to be forwarded by the first node, so that a measurement result of the beam not to be forwarded by the first node is $Q_0$. $Q_0$ is then compared with measurement results $\{Q_i\}$, i=1, n of other beams. If $|Q_0-Q_i|<\delta$, it is determined that there is a QCL relationship, so as to determine that the terminal directly accesses the network device; otherwise, it is determined that there is no QCL relationship or it is determined that the terminal accesses the network device through the first node.

It should be noted that the second threshold and third threshold may be configured by the network device or defined by a protocol.

In another manner, in a case that measurement results of the N beams include a channel correlation measurement result between the N beams, if a channel correlation between the N beams is greater than a first threshold, the N beams have a QCL relationship.

The channel correlation between the N beams being greater than the first threshold may indicate a strong channel correlation between the N beams. In this case, it is determined that the N beams have a QCL relationship.

In another manner, in a case that measurement results of the N beams include signal quality measurement results of the N beams and a channel correlation measurement result between the N beams, if a difference between the signal quality measurement results of the N beams satisfies a first condition and a channel correlation between the N beams is greater than a first threshold, the N beams have a QCL relationship.

In an optional implementation, in a case that measurement results of the N beams include signal quality measurement results of the N beams and the N beams have a QCL relationship, the target measurement result includes a combined measurement result, or the target measurement result includes a measurement result determined based on the combined measurement result, where the combined measurement result is a measurement result obtained by combining the signal quality measurement results of the N beams;

or, in a case that measurement results of the N beams include signal quality measurement results of the N beams and the N beams have no QCL relationship, the target measurement result includes signal quality measurement results of several beams of the N beams.

The signal quality measurement results of several beams of the N beams may be signal quality measurement results of one or more beams in the N beams.

The combined measurement result may be a calculation result such as a maximum value, a minimum value, or an average value of the signal quality measurement results of the N beams, and is specifically one measurement result.

In this implementation, in a case that there is a QCL relationship, the target measurement result may include only the combined measurement result. For example, if the measurement results of the N beams are close, that is, the difference between the measurement results is less than a threshold, only one measurement result is reported, and the measurement result may be a calculation result such as a maximum value, a minimum value, or an average value of the measurement results of the N beams. For another example, if the channel correlation of the N beams is strong (greater than a threshold), only one measurement result is reported, and the measurement result may be also a calculation result such as a maximum value, a minimum value, or an average value of the measurement results of the N beams.

In this implementation, the combined measurement result can be reported, thereby reducing signaling overheads and ensuring accuracy of the reported measurement result.

Optionally, in the case that the N beams have a QCL relationship, the target measurement result includes: top K signal quality measurement results selected from the combined measurement result and signal quality measurement results of other M-N beams, where K is a positive integer; or in the case that the N beams have no QCL relationship, the target measurement result further includes a signal quality measurement result of at least one beam of M-N beams, where the signal quality measurement result of the at least one beam is a signal quality measurement result of at least one beam selected by sorting signal quality measurement results of the M-N beams; where the M-N beams are M-N beams of the network device other than the N beams.

K may be a preconfigured quantity of to-be-reported beams, and the quantity may be configured by the network device or prescribed by the protocol. In this implementation, the top K signal quality measurement results are selected from the combined measurement result and signal quality measurement results of other M-N beams, and therefore the reported measurement results are more conducive to scheduling by the network device.

In addition, in a case that there is no QCL relationship, measurement results of better signal quality in the N beams may be included, and measurement results of better signal quality in other beams may be also included, so that the reported measurement results are more conducive to scheduling by the network device. For example, the measurement results of the N beams are sorted and several of the results are selected for reporting, and measurement results of other beams are sorted and several of the measurement results are selected for reporting.

In an optional implementation, the first information further includes at least one of the following:

indication information for indicating whether the target measurement result includes the combined measurement result;

indication information for indicating whether the target measurement result includes the measurement result determined based on the combined measurement result; and indication information for indicating whether the N beams have a QCL relationship.

In an optional implementation, the first information includes:

the measurement results of the N beams, where the network device determines whether the N beams have a QCL relationship or determines the access manner of the terminal, based on the judgment criterion.

For the combined measurement result, reference may be made to the description of the foregoing implementation, and details are not repeated herein.

In this implementation, with the indication information, the network device can quickly determine the access manner of the terminal.

In an optional implementation, after the reporting the first information to the network device based on the measurement results of the N beams, the method further includes:

in the case that the N beams have a QCL relationship, during measurement of the N beams, performing measurement on part of the N beams.

In this implementation, after the QCL relationship is determined, measurement can be performed on only part of the N beams, so as to reduce the number of measurements on a single beam in subsequent measurement periods, so as to reduce power consumption and save resources of the terminal.

Further, during configuration of beam measurement, the network device may adjust the configuration of beam measurement based on the access manner of the terminal or the QCL relationship, for example, reducing the number of the N beams to be measured by the terminal, so as to achieve power saving effects.

In an optional implementation, in a case that the N beams have a QCL relationship, the access state information indicates that the access manner for accessing the network device by the terminal is indirectly accessing the network device; or in a case that the N beams have no QCL relationship, the access state information indicates that the access manner for accessing the network device by the terminal is indirectly accessing the network device.

In this implementation, the access manner of the terminal can be accurately determined. Further, after determining the access manner of the terminal, the network device may schedule corresponding time-frequency resources for the terminal. For example, for the terminal directly accessing the network device, the network device may perform scheduling on all available slots; and for the terminal accessing the network device through the first node, the network device may perform scheduling on valid forwarding time-frequency resources of the first node.

In addition, in this embodiment of the present invention, after the first node accesses the cell of the network device, the network device may determine presence of the first node and its working state information. The working state information of the first node may include information such as the number of forwarding beams of the first node, duration and occurrence period of each forwarding beam, and the like. In addition, after the first node accesses the cell of the network device, the first node may be synchronized with the cell to ensure that switching and turning-on/off operations on the forwarding beams of the first node are synchronized with a time system of the cell, for example, switching is performed at a slot boundary, a subframe boundary, a frame boundary, or an OFDM symbol boundary. Further, a transmit beam between the network device and the first node is determined, and at least one SSB beam is directed to the first node in one SSB transmission period.

The terminal accessing the network device through the first node may communicate with the network device in a case that both the forwarding beam of the first node is valid (the forwarding beam of the first node is directed to the terminal) and the beam from the network device to the first node is valid (the beam of the network device is directed to the first node). Optionally, the working period of the first node may be one SSB period or a plurality of consecutive SSB periods. For details, refer to FIG. 4 and FIG. 5. When the terminal accesses the network device through the first node, in a case that the transmit beams of the network device are the same and the beams of the first node are also the same, the terminal may determine that received beams satisfy the QCL assumption. Therefore, for a terminal accessing the network device through the first node or a terminal in an unknown state, whether the QCL relationship is satisfied or not is determined through calculation based on a period of the reference signal in the working period of the first node.

In addition, in this embodiment of the present invention, the measurement results and access manner of the terminal can be updated in real time.

In this embodiment of the present invention, measurement is performed on the M beams to obtain the measurement results of the M beams, where the N beams in the M beams are beams generated by the network device based on the same transmit spatial filter; the first information is reported to the network device based on the measurement results of part or all of the M beams, where the first information includes at least one of the following: a target measurement result and access state information. The target measurement result is: a measurement result determined based on the measurement results of part or all of the M beams. The access state information is information that is for indicating an access manner of accessing the network device by the terminal and that is determined based on the measurement results of part or all of the M beams; and the access manner is directly accessing the network device by the terminal or indirectly accessing the network device by the terminal. In this way, the terminal can report the first information to the network device, so that the network device can determine, based on the first information, the access manner for accessing the network device by the terminal.

Figure 6:
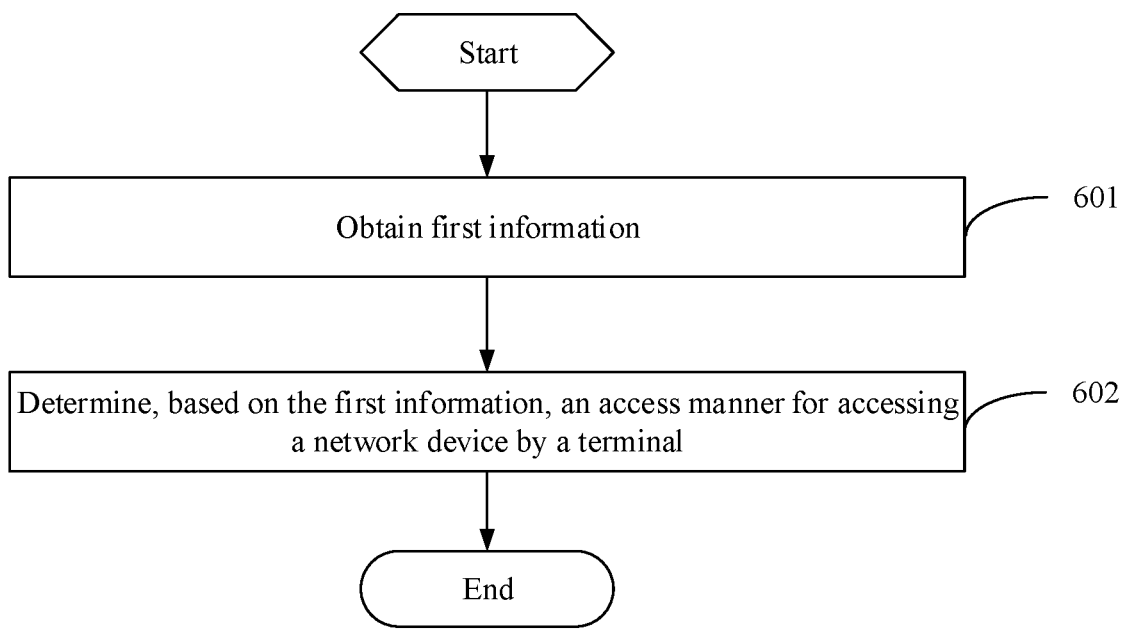
FIG. 6 is a flowchart of another information reporting method according to an embodiment of the present invention.

Referring to FIG. 6, FIG. 6 is a flowchart of an access manner determining method according to an embodiment of the present invention. The method is applied to a network device, and as shown in FIG. 6, includes the following steps.

Step 601: Obtain first information, where the first information includes: at least one of a target measurement result and access state information.

Step 602: Determine, based on the first information, an access manner for accessing the network device by a terminal.

The target measurement result is: a measurement result determined based on the measurement results of part or all of the M beams, and the access state information is information that is for indicating an access manner of accessing the network device by the terminal and that is determined based on the measurement results of part or all of the M beams; and N beams in the M beams are beams generated by the network device based on a same transmit spatial filter, M and N are integers greater than 1, and N is less than or equal to M; and the access manner is directly accessing the network device by the terminal or indirectly accessing the network device by the terminal.

The determining, based on the first information, the access manner for accessing the network device by the terminal is determining an access state of the terminal.

Optionally, before the obtaining first information, the method further includes:

sending configuration information, where the configuration information is used to indicate that the N beams are beams generated by the same transmit spatial filter.

Optionally, the configuration information indicates that N reference signals are reference signals with a QCL relationship, so as to implicitly indicate that the N beams are generated by the same transmit spatial filter, and the N beams are beams for sending the N reference signals; or the configuration information indicates a working time of forwarding a beam by a first node, so as to implicitly indicate that the N beams are generated by the same transmit spatial filter and the N beams are beams working during the working time for the network device, where the first node is a node for forwarding related signals of the network device.

Optionally, the target measurement result includes at least one of the following:

signal quality measurement results of the N beams and a channel correlation measurement result between the N beams.

Optionally, the determining, based on the first information, an access manner for accessing the network device by a terminal includes:
  determining, based on the target measurement result, whether the N beams have a quasi co-location QCL relationship; and
  determining, based on whether the N beams have a QCL relationship, the access manner for accessing the network device by the terminal; where
  in a case that the N beams have a QCL relationship, the access manner for accessing the network device by the terminal is directly accessing the network device; or
  in a case that the N beams have no QCL relationship, the access manner for accessing the network device by the terminal is indirectly accessing the network device.

Optionally, if a channel correlation between the N beams is greater than a first threshold, the N beams have a QCL relationship; or
  the signal quality measurement result implicitly indicates whether the N beams have a QCL relationship.

Optionally, in a case that the signal quality measurement result includes a combined measurement result or the target measurement result includes a measurement result determined based on the combined measurement result, the N beams have a QCL relationship, where the combined measurement result is a measurement result obtained by combining the signal quality measurement results of the N beams; and
  in a case that the signal quality measurement result includes signal quality measurement results of several beams of the N beams, the N beams have no QCL relationship.

Optionally, the first information further includes at least one of the following:
  indication information for indicating whether the target measurement result includes the combined measurement result;
  indication information for indicating whether the target measurement result includes the measurement result determined based on the combined measurement result; and
  indication information for indicating whether the N beams have a QCL relationship.

Optionally, the method further includes:
  scheduling a corresponding transmission resource for the terminal based on the access manner for accessing the network device by the terminal.

Optionally, the N beams include beams whose signals are forwarded by a first node and beams whose signals are not forwarded by the first node.

It should be noted that this embodiment is an implementation of a network device side corresponding to the embodiment shown in FIG. 2. For the specific implementation, reference may be made to the related description of the embodiment shown in FIG. 2. To avoid repeated descriptions, details are not repeated in this embodiment. In this embodiment, the terminal can also report the first information to the network device, so that the network device can determine, based on the first information, the access manner for accessing the network device by the terminal, further helping improve communication quality between the network device and the terminal.

Figure 7:
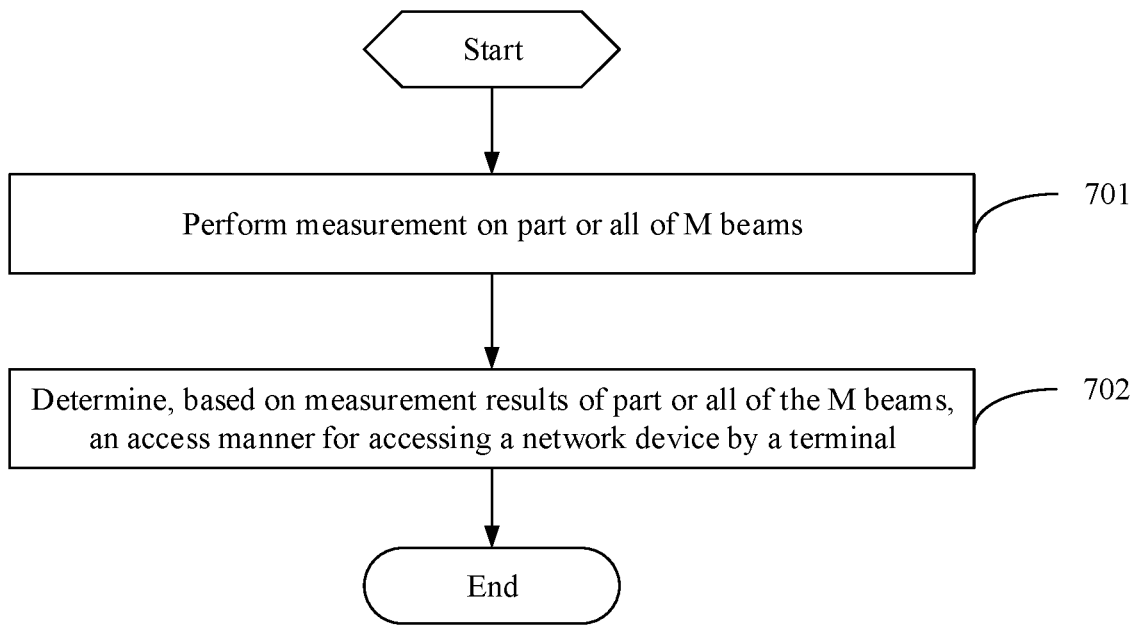
FIG. 7 is a flowchart of an access manner determining method according to an embodiment of the present invention.

Referring to FIG. 7, FIG. 7 is a flowchart of an access manner determining method according to an embodiment of the present invention. The method is applied to a network device, and as shown in FIG. 7, includes the following steps.

Step 701: Perform measurement on part or all of M beams, where N beams in the M beams are beams generated by the network device based on a same receive spatial filter (spatial domain receive filter), M and N are integers greater than 1, and N is less than or equal to M.

Measurement on the M beams may be measurement on uplink signals sent by a terminal by using the M beams, for example, sounding radio signals (SRS), physical random access channel (PRACH) signals, DMRSs, or other pilot signals.

The N beams are directed to the first node, and therefore part or all of uplink signals on the N beams to be measured are uplink signals sent by the terminal to the first node and then sent by the first node to the network device. In addition, these uplink signals may be configured to be in a plurality of slots or subframes, corresponding to working periods of the forwarding beams of the first node.

The number of uplink signals on the N beams may be greater than the number of forwarding beams of the first node, and at least one of transmission resources of these uplink signals corresponds to a non-forwarding time period of the first node.

Step 702: Determine, based on measurement results of part or all of the M beams, an access manner for accessing the network device by the terminal.

The access manner is directly accessing the network device by the terminal or indirectly accessing the network device by the terminal.

It should be noted that, in this embodiment, the network device performs measurement on the uplink signals sent by the terminal. For implementation of this embodiment, reference may be made to the previous implementation of measurement performed by the terminal, which is not repeated herein.

In this embodiment, with the foregoing steps, the measurement results of the M beams can be obtained through measurement, and the access manner of the terminal can be determined, thereby helping improve communication quality between the network device and the terminal. In addition, the access manner of the terminal may be further notified to the terminal. A base station notifies the terminal of an access state.

Optionally, measurement results of the N beams include at least one of the following:
  signal quality measurement results of the N beams and a channel correlation measurement result between the N beams.

Optionally, the determining, based on measurement results of part or all of the M beams, an access manner for accessing the network device by a terminal includes:
  determining, based on measurement results of the N beams, whether the N beams have a quasi co-location QCL relationship; and
  determining, based on whether the N beams have a QCL relationship, the access manner for accessing the network device by the terminal.

Optionally, in a case that measurement results of the N beams include signal quality measurement results of the N beams, if a difference between the signal quality measurement results of the N beams satisfies a first condition, the N beams have a QCL relationship; or
  in a case that measurement results of the N beams include a channel correlation measurement result between the N beams, if a channel correlation between the N beams is greater than a first threshold, the N beams have a QCL relationship; or in a case that measurement results of the N beams include
signal quality measurement results of the N beams and
a channel correlation measurement result between the
N beams, if a difference between the signal quality
measurement results of the N beams satisfies a first
condition and a channel correlation between the N
beams is greater than a first threshold, the N beams
have a QCL relationship.

Optionally, the difference between the signal quality measurement results of the N beams satisfying the first condition means:

a difference between a signal quality measurement result
of a first beam in the N beams and a signal quality
reference result is less than or equal to a second
threshold, where the first beam is any beam with a
signal quality measurement result in the N beams, and
the signal quality reference result is a calculation result
of the signal quality measurement results of the N
beams; or an absolute difference between a signal quality measurement result of a second beam in the N beams and a
signal quality measurement result of a first beam is less
than or equal to a third threshold, where the first beam
is any beam with a signal quality measurement result in
the N beams, the second beam is a beam whose signal
is not affected by a first node in the N beams, and the
first node is a node for forwarding related signals of the
network device.

Optionally, the method further includes:
scheduling a corresponding transmission resource for the
terminal based on the access manner for accessing the
network device by the terminal.

Optionally, the N beams include beams whose signals are forwarded by a first node and beams whose signals are not forwarded by the first node.

Optionally, the method further includes:
in the case that the N beams have a QCL relationship,
during measurement of the N beams, performing measurement on part of the N beams.

Certainly, beam monitoring may alternatively be adjusted directly based on the access manner of the terminal, for example, when measurement is performed on the N beams again, measurement may be performed on part of the N beams, so as to implement power saving.

It should be noted that this embodiment is an implementation of the terminal corresponding to the embodiment shown in FIG. 2. For the specific implementation, reference may be made to the related description of the embodiment shown in FIG. 2. To avoid repetition, details are not described again in this embodiment. In this embodiment, the network device can also determine, based on the first information, the access manner for accessing the network device by the terminal, thereby helping improve communication quality between the network device and the terminal.

Figure 8:
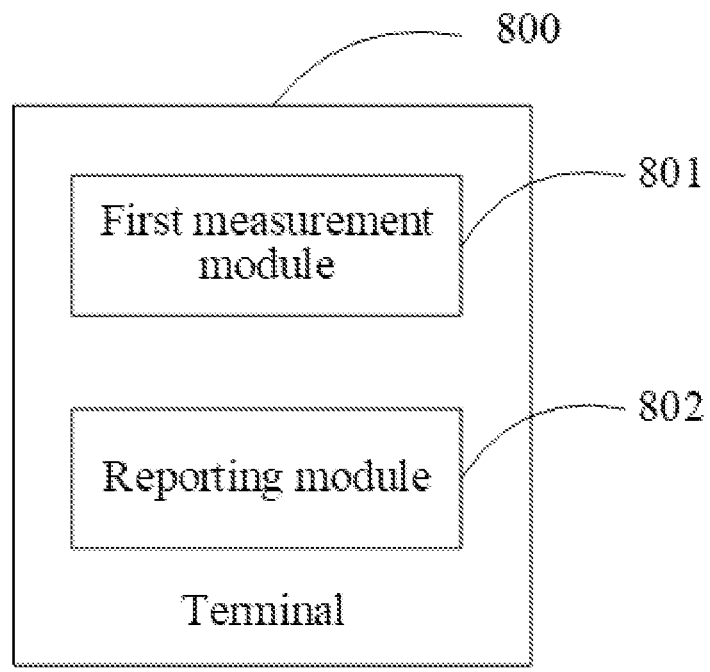
FIG. 8 is a structural diagram of a terminal according to an embodiment of the present invention.

Referring to FIG. 8, FIG. 8 is a structural diagram of a terminal according to an embodiment of the present invention. As shown in FIG. 8, the terminal 800 includes:

a first measurement module 801, configured to perform
measurement on part or all of M beams, where N beams
in the M beams are beams generated by a network
device based on a same transmit spatial filter, M and N
are integers greater than 1, and N is less than or equal
to M; and a reporting module 802, configured to report first information to the network device based on measurement
results of part or all of the M beams, where the first
information includes at least one of the following:

a target measurement result and access state information;
where the target measurement result is: a measurement result
determined based on the measurement results of part or
all of the M beams, and the access state information is
information that is for indicating an access manner of
accessing the network device by the terminal and that
is determined based on the measurement results of part
or all of the M beams; and the access manner is directly accessing the network
device by the terminal or indirectly accessing the
network device by the terminal.

Optionally, the target measurement result includes at least one of the following:

signal quality measurement results of the N beams and a
channel correlation measurement result between the N
beams.

Figure 9:
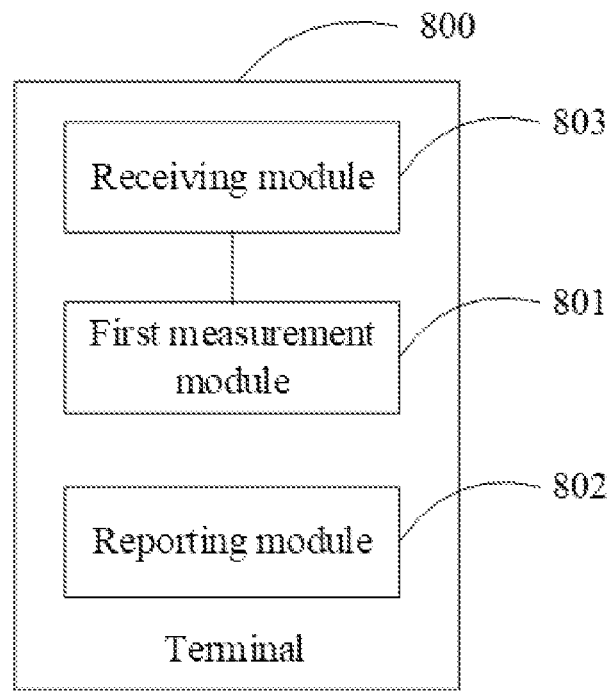
FIG. 9 is a structural diagram of another terminal according to an embodiment of the present invention.

Optionally, as shown in FIG. 9, the terminal further includes:

a receiving module 803, configured to receive configuration information, where the configuration information
is used to indicate that the N beams are beams generated by the same transmit spatial filter.

Optionally, the configuration information indicates that N reference signals are reference signals with a QCL relationship, so as to implicitly indicate that the N beams are generated by the same transmit spatial filter, and the N beams are beams for sending the N reference signals; or the configuration information indicates a working time of
forwarding a beam by a first node, so as to implicitly
indicate that the N beams are generated by the same
transmit spatial filter and the N beams are beams
working during the working time for the network
device, where the first node is a node for forwarding
related signals of the network device.

Optionally, the reporting module 802 is configured to determine, based on measurement results of the N beams, whether the N beams have a quasi co-location QCL relationship; and report the first information to the network device based on whether the N beams have a QCL relationship.

Optionally, in a case that measurement results of the N beams include signal quality measurement results of the N beams, if a difference between the signal quality measurement results of the N beams satisfies a first condition, the N beams have a QCL relationship; or in a case that measurement results of the N beams include
a channel correlation measurement result between the
N beams, if a channel correlation between the N beams
is greater than a first threshold, the N beams have a
QCL relationship; or in a case that measurement results of the N beams include
signal quality measurement results of the N beams and
a channel correlation measurement result between the
N beams, if a difference between the signal quality
measurement results of the N beams satisfies a first
condition and a channel correlation between the N
beams is greater than a first threshold, the N beams
have a QCL relationship.

Optionally, the difference between the signal quality measurement results of the N beams satisfying the first condition means:

a difference between a signal quality measurement result
of a first beam in the N beams and a signal quality
reference result is less than or equal to a second
threshold, where the first beam is any beam with a
signal quality measurement result in the N beams, and the signal quality reference result is a calculation result of the signal quality measurement results of the N beams; or an absolute difference between a signal quality measurement result of a second beam in the N beams and a signal quality measurement result of a first beam is less than or equal to a third threshold, where the first beam is any beam with a signal quality measurement result in the N beams, the second beam is a beam whose signal is not affected by a first node in the N beams, and the first node is a node for forwarding related signals of the network device.

Optionally, in a case that measurement results of the N beams include signal quality measurement results of the N beams and the N beams have a QCL relationship, the target measurement result includes a combined measurement result, or the target measurement result includes a measurement result determined based on the combined measurement result, where the combined measurement result is a measurement result obtained by combining the signal quality measurement results of the N beams;

or, in a case that measurement results of the N beams include signal quality measurement results of the N beams and the N beams have no QCL relationship, the target measurement result includes signal quality measurement results of several beams of the N beams.

Optionally, in the case that the N beams have a QCL relationship, the target measurement result includes: top K signal quality measurement results selected from the combined measurement result and signal quality measurement results of other M-N beams, where K is a positive integer; or in the case that the N beams have no QCL relationship, the target measurement result further includes a signal quality measurement result of at least one beam of M-N beams, where the signal quality measurement result of the at least one beam is a signal quality measurement result of at least one beam selected by sorting signal quality measurement results of the M-N beams; where the M-N beams are M-N beams of the network device other than the N beams.

Optionally, the first information further includes at least one of the following:

indication information for indicating whether the target measurement result includes the combined measurement result;

indication information for indicating whether the target measurement result includes the measurement result determined based on the combined measurement result; and indication information for indicating whether the N beams have a QCL relationship.

Figure 10:
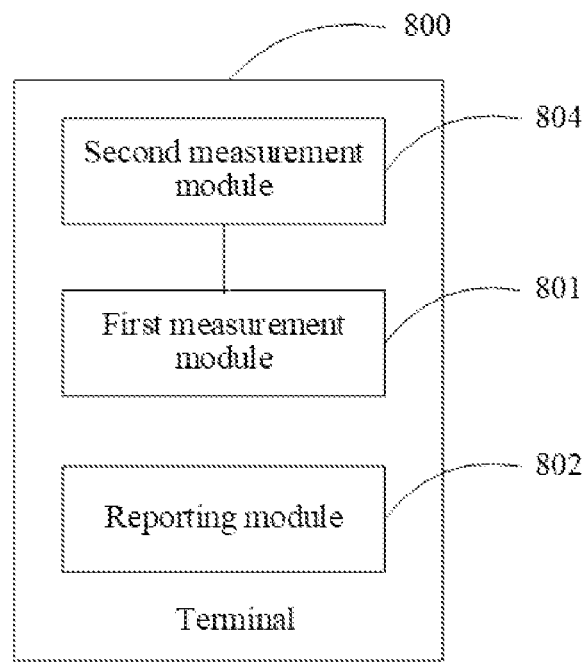
FIG. 10 is a structural diagram of another terminal according to an embodiment of the present invention.

Optionally, as shown in FIG. 10, the terminal further includes:

a second measurement module 804, configured to: in the case that the N beams have a QCL relationship, during measurement of the N beams, perform measurement on part of the N beams.

Optionally, in a case that the N beams have a QCL relationship, the access state information indicates that the access manner for accessing the network device by the terminal is indirectly accessing the network device.

in a case that the N beams have no QCL relationship, the access state information indicates that the access manner for accessing the network device by the terminal is indirectly accessing the network device.

Optionally, the N beams include beams whose signals are forwarded by a first node and beams whose signals are not forwarded by the first node.

The terminal provided in this embodiment of the present invention is capable of implementing the processes implemented by the terminal in the method embodiment in FIG. 2. To avoid repetition, details are not described herein again. In this way, the network device can determine, based on the first information, the access manner for accessing the network device by the terminal, thereby helping improve communication quality between the network device and the terminal.

Figure 11:
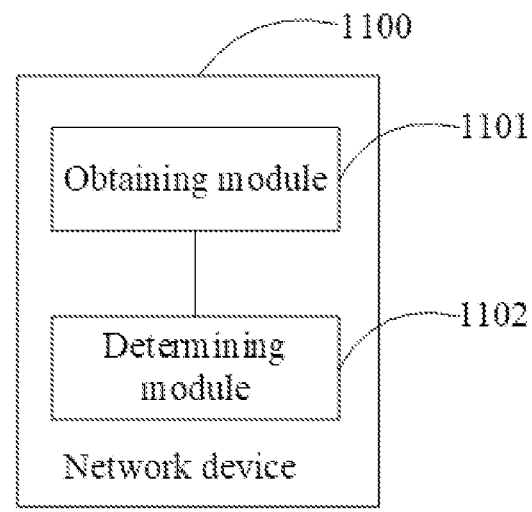
FIG. 11 is a structural diagram of a network device according to an embodiment of the present invention.

Referring to FIG. 11, FIG. 11 is a structural diagram of a network device according to an embodiment of the present invention. As shown in FIG. 11, the network device 1100 includes:

an obtaining module 1101, configured to obtain first information, where the first information includes: at least one of a target measurement result and access state information; and a determining module 1102, configured to determine, based on the first information, an access manner for accessing the network device by a terminal, where the target measurement result is: a measurement result determined based on the measurement results of part or all of the M beams, and the access state information is information that is for indicating an access manner of accessing the network device by the terminal and that is determined based on the measurement results of part or all of the M beams; and N beams in the M beams are beams generated by the network device based on a same transmit spatial filter, M and N are integers greater than 1, and N is less than or equal to M; and the access manner is directly accessing the network device by the terminal or indirectly accessing the network device by the terminal.

Figure 12:
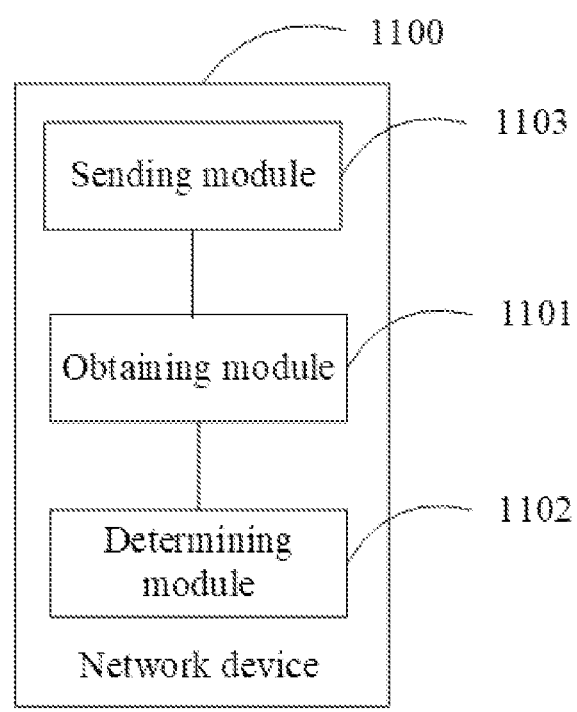
FIG. 12 is a structural diagram of another network device according to an embodiment of the present invention.

Optionally, as shown in FIG. 12, the network device 1100 further includes:

a sending module 1103, configured to send configuration information, where the configuration information is used to indicate that the N beams are beams generated by the same transmit spatial filter.

Optionally, the configuration information indicates that N reference signals are reference signals with a QCL relationship, so as to implicitly indicate that the N beams are generated by the same transmit spatial filter, and the N beams are beams for sending the N reference signals; or the configuration information indicates a working time of forwarding a beam by a first node, so as to implicitly indicate that the N beams are generated by the same transmit spatial filter and the N beams are beams working during the working time for the network device, where the first node is a node for forwarding related signals of the network device.

Optionally, the target measurement result includes at least one of the following:

signal quality measurement results of the N beams and a channel correlation measurement result between the N beams.

Optionally, the determining module 1102 is configured to determine, based on the target measurement result, whether the N beams have a quasi co-location QCL relationship; and determine, based on whether the N beams have a QCL relationship, the access manner for accessing the network device by the terminal; where in a case that the N beams have a QCL relationship, the access manner for accessing the network device by the terminal is directly accessing the network device; or in a case that the N beams have no QCL relationship, the access manner for accessing the network device by the terminal is indirectly accessing the network device.

Optionally, if a channel correlation between the N beams is greater than a first threshold, the N beams have a QCL relationship; or the signal quality measurement result implicitly indicates whether the N beams have a QCL relationship.

Optionally, in a case that the signal quality measurement result includes a combined measurement result or the target measurement result includes a measurement result determined based on the combined measurement result, the N beams have a QCL relationship, where the combined measurement result is a measurement result obtained by combining the signal quality measurement results of the N beams; and in a case that the signal quality measurement result includes signal quality measurement results of several beams of the N beams, the N beams have no QCL relationship.

Optionally, the first information further includes at least one of the following:

indication information for indicating whether the target measurement result includes the combined measurement result;

indication information for indicating whether the target measurement result includes the measurement result determined based on the combined measurement result; and indication information for indicating whether the N beams have a QCL relationship.

Figure 13:
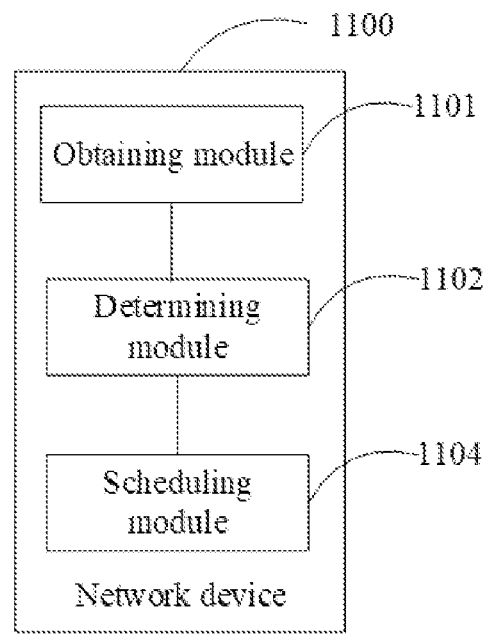
FIG. 13 is a structural diagram of another network device according to an embodiment of the present invention.

Optionally, as shown in FIG. 13, the network device 1100 further includes:

a scheduling module 1104, configured to schedule a corresponding transmission resource for the terminal based on the access manner for accessing the network device by the terminal.

Optionally, the N beams include beams whose signals are forwarded by a first node and beams whose signals are not forwarded by the first node.

Figure 14:
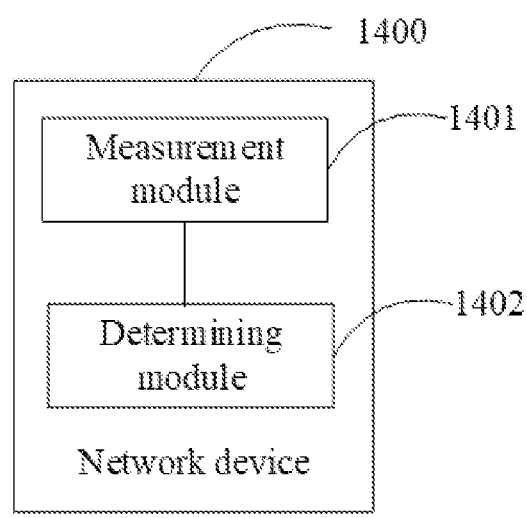
FIG. 14 is a structural diagram of another network device according to an embodiment of the present invention.

The network device provided in this embodiment of the present invention is capable of implementing the processes implemented by the network device in the method embodiment in FIG. 6. To avoid repetition, details are not described herein again. In this way, the network device can determine, based on the first information, the access manner for accessing the network device by the terminal, thereby helping improve communication quality between the network device and the terminal Referring to FIG. 14, FIG. 14 is a structural diagram of another network device according to an embodiment of the present invention. As shown in FIG. 14, the network device 1400 includes:

a measurement module 1401, configured to perform measurement on part or all of M beams, where N beams in the M beams are beams generated by the network device based on a same receive spatial filter, M and N are integers greater than 1, and N is less than or equal to M; and a determining module 1402, configured to determine, based on measurement results of part or all of the M beams, an access manner for accessing the network device by a terminal; where the access manner is directly accessing the network device by the terminal or indirectly accessing the network device by the terminal.

Optionally, measurement results of the N beams include at least one of the following:

signal quality measurement results of the N beams and a channel correlation measurement result between the N beams.

Optionally, the determining module 1502 is configured to determine, based on measurement results of the N beams, whether the N beams have a quasi co-location QCL relationship; and determine, based on whether the N beams have a QCL relationship, the access manner for accessing the network device by the terminal.

Optionally, in a case that measurement results of the N beams include signal quality measurement results of the N beams, if a difference between the signal quality measurement results of the N beams satisfies a first condition, the N beams have a QCL relationship; or in a case that measurement results of the N beams include a channel correlation measurement result between the N beams, if a channel correlation between the N beams is greater than a first threshold, the N beams have a QCL relationship; or in a case that measurement results of the N beams include signal quality measurement results of the N beams and a channel correlation measurement result between the N beams, if a difference between the signal quality measurement results of the N beams satisfies a first condition and a channel correlation between the N beams is greater than a first threshold, the N beams have a QCL relationship.

Optionally, the difference between the signal quality measurement results of the N beams satisfying the first condition means:

a difference between a signal quality measurement result of a first beam in the N beams and a signal quality reference result is less than or equal to a second threshold, where the first beam is any beam with a signal quality measurement result in the N beams, and the signal quality reference result is a calculation result of the signal quality measurement results of the N beams; or an absolute difference between a signal quality measurement result of a second beam in the N beams and a signal quality measurement result of a first beam is less than or equal to a third threshold, where the first beam is any beam with a signal quality measurement result in the N beams, the second beam is a beam whose signal is not affected by a first node in the N beams, and the first node is a node for forwarding related signals of the network device.

Figure 15:
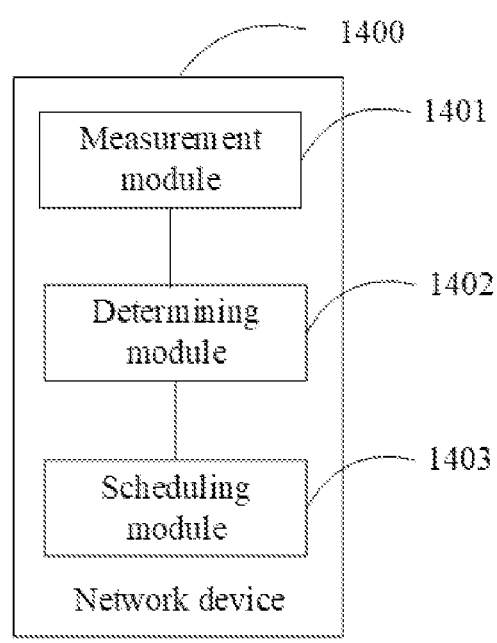
FIG. 15 is a structural diagram of another network device according to an embodiment of the present invention.

Optionally, as shown in FIG. 15, the network device 1400 further includes:

a scheduling module 1403, configured to schedule a corresponding transmission resource for the terminal based on the access manner for accessing the network device by the terminal.

Optionally, the N beams include beams whose signals are forwarded by a first node and beams whose signals are not forwarded by the first node.

Figure 16:
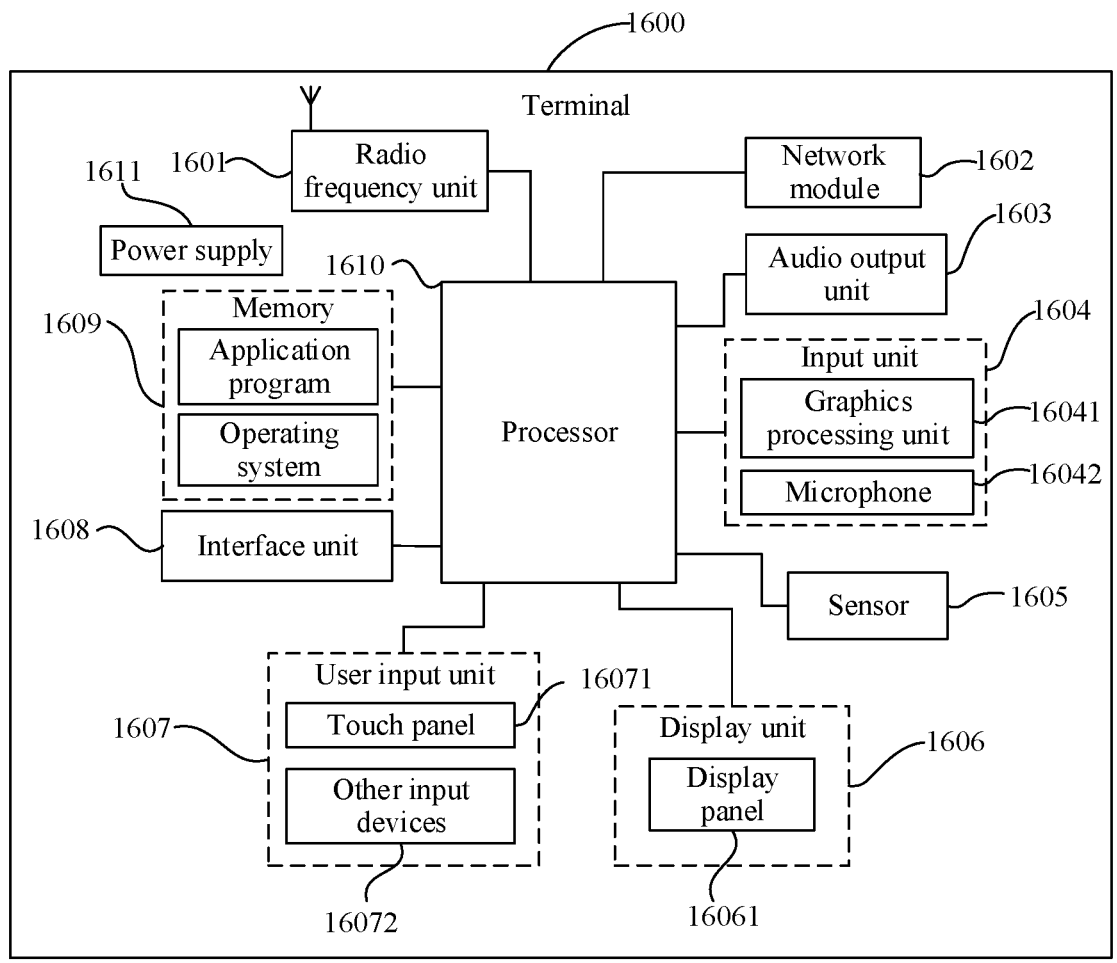
FIG. 16 is a structural diagram of another terminal according to an embodiment of the present invention.

The network device provided in this embodiment of the present invention is capable of implementing the processes implemented by the network device in the method embodiment in FIG. 7. To avoid repetition, details are not described herein again. In this way, the network device can determine, based on the first information, the access manner for accessing the network device by the terminal, thereby helping improve communication quality between the network device and the terminal FIG. 16 is a schematic diagram of a hardware structure of a terminal for implementing the embodiments of the present invention.

The terminal 1600 includes but is not limited to components such as a radio frequency unit 1601, a network module 1602, an audio output unit 1603, an input unit 1604, a sensor 1605, a display unit 1606, a user input unit 1607, an interface unit 1608, a memory 1609, a processor 1610, and a power supply 1611. A person skilled in the art may understand that the structure of the terminal shown in FIG. 16 does not constitute any limitation on the terminal device. The terminal may include more or fewer components than those shown in the figure, or a combination of some components, or the components disposed differently. In this embodiment of the present invention, the terminal includes, but is not limited to, a mobile phone, a tablet computer, a laptop computer, a personal digital assistant, an in-vehicle terminal, a wearable device, a pedometer, and the like.

The radio frequency unit 1601 is configured to perform measurement on part or all of M beams, where N beams in the M beams are beams generated by a network device based on a same transmit spatial filter, M and N are integers greater than 1, and N is less than or equal to M; and the radio frequency unit 1601 is configured to report first information to the network device based on measurement results of part or all of the M beams, where the first information includes at least one of the following:

a target measurement result and access state information; where the target measurement result is: a measurement result determined based on the measurement results of part or all of the M beams, and the access state information is information that is for indicating an access manner of accessing the network device by the terminal and that is determined based on the measurement results of part or all of the M beams; and the access manner is directly accessing the network device by the terminal or indirectly accessing the network device by the terminal.

Optionally, the target measurement result includes at least one of the following:

signal quality measurement results of the N beams and a channel correlation measurement result between the N beams.

Optionally, before performing measurement on the M beams to obtain the measurement results of the M beams, the radio frequency unit 1601 is further configured to:

receive configuration information, where the configuration information is used to indicate that the N beams are beams generated by the same transmit spatial filter.

Optionally, the configuration information indicates that N reference signals are reference signals with a QCL relationship, so as to implicitly indicate that the N beams are generated by the same transmit spatial filter, and the N beams are beams for sending the N reference signals; or the configuration information indicates a working time of forwarding a beam by a first node, so as to implicitly indicate that the N beams are generated by the same transmit spatial filter and the N beams are beams working during the working time for the network device, where the first node is a node for forwarding related signals of the network device.

Optionally, the reporting first information to the network device based on measurement results of part or all of the M beams includes:

determining, based on measurement results of the N beams, whether the N beams have a quasi co-location QCL relationship; and reporting the first information to the network device based on whether the N beams have a QCL relationship.

Optionally, in a case that measurement results of the N beams include signal quality measurement results of the N beams, if a difference between the signal quality measurement results of the N beams satisfies a first condition, the N beams have a QCL relationship; or in a case that measurement results of the N beams include a channel correlation measurement result between the N beams, if a channel correlation between the N beams is greater than a first threshold, the N beams have a QCL relationship; or in a case that measurement results of the N beams include signal quality measurement results of the N beams and a channel correlation measurement result between the N beams, if a difference between the signal quality measurement results of the N beams satisfies a first condition and a channel correlation between the N beams is greater than a first threshold, the N beams have a QCL relationship.

Optionally, the difference between the signal quality measurement results of the N beams satisfying the first condition means:

a difference between a signal quality measurement result of a first beam in the N beams and a signal quality reference result is less than or equal to a second threshold, where the first beam is any beam with a signal quality measurement result in the N beams, and the signal quality reference result is a calculation result of the signal quality measurement results of the N beams; or an absolute difference between a signal quality measurement result of a second beam in the N beams and a signal quality measurement result of a first beam is less than or equal to a third threshold, where the first beam is any beam with a signal quality measurement result in the N beams, the second beam is a beam whose signal is not affected by a first node in the N beams, and the first node is a node for forwarding related signals of the network device.

Optionally, in a case that measurement results of the N beams include signal quality measurement results of the N beams and the N beams have a QCL relationship, the target measurement result includes a combined measurement result, or the target measurement result includes a measurement result determined based on the combined measurement result, where the combined measurement result is a measurement result obtained by combining the signal quality measurement results of the N beams;

or, in a case that measurement results of the N beams include signal quality measurement results of the N beams and the N beams have no QCL relationship, the target measurement result includes signal quality measurement results of several beams of the N beams.

Optionally, in the case that the N beams have a QCL relationship, the target measurement result includes: top K signal quality measurement results selected from the combined measurement result and signal quality measurement results of other M-N beams, where K is a positive integer; or in the case that the N beams have no QCL relationship, the target measurement result further includes a signal quality measurement result of at least one beam of M-N beams, where the signal quality measurement result of the at least one beam is a signal quality measurement result of at least one beam selected by sorting signal quality measurement results of the M-N beams; where the M-N beams are M-N beams of the network device other than the N beams.

Optionally, the first information further includes at least one of the following:

indication information for indicating whether the target measurement result includes the combined measurement result;

indication information for indicating whether the target measurement result includes the measurement result determined based on the combined measurement result; and indication information for indicating whether the N beams have a QCL relationship.

Optionally, after the reporting the first information to the network device based on the measurement results of the N beams, the radio frequency unit 1601 or the processor 1610 is further configured to:

in the case that the N beams have a QCL relationship, during measurement of the N beams, performing measurement on part of the N beams.

Optionally, in a case that the N beams have a QCL relationship, the access state information indicates that the access manner for accessing the network device by the terminal is indirectly accessing the network device.

in a case that the N beams have no QCL relationship, the access state information indicates that the access manner for accessing the network device by the terminal is indirectly accessing the network device.

Optionally, the N beams include beams whose signals are forwarded by a first node and beams whose signals are not forwarded by the first node.

With the terminal described above, the network device can determine, based on the first information, the access manner for accessing the network device by the terminal, thereby helping improve communication quality between the network device and the terminal.

It should be understood that in this embodiment of the present invention, the radio frequency unit 1601 may be configured to: receive and transmit signals in an information receiving/sending process or a call process; and specifically, after receiving downlink data from a base station, transmit the downlink information to the processor 1610 for processing, and in addition, transmit uplink data to the base station. Generally, the radio frequency unit 1601 includes but is not limited to an antenna, at least one amplifier, a transceiver, a coupler, a low noise amplifier, a duplexer, and the like. In addition, the radio frequency unit 1601 may further communicate with a network and another device through a wireless communications system.

The terminal provides a user with wireless broadband interne access through the network module 1602, for example, helping the user to transmit and receive e-mails, browse web pages, and access streaming media.

The audio output unit 1603 may convert audio data received by the radio frequency unit 1601 or the network module 1602 or stored in the memory 1609 into an audio signal, and output the audio signal as a sound. Furthermore, the audio output unit 1603 may also provide audio output (for example, a call signal received sound or a message received sound) related to a specific function performed by the terminal 1600. The audio output unit 1603 includes a speaker, a buzzer, a receiver, and the like.

The input unit 1604 is configured to receive an audio or video signal. The input unit 1604 may include a graphics processing unit (GPU) 16041 and a microphone 16042. The graphics processing unit 16041 processes image data of a still picture or video obtained by an image capture apparatus (such as a camera) in a video capture mode or an image capture mode. A processed image frame may be displayed on the display unit 1606. An image frame processed by the graphics processing unit 16041 may be stored in the memory 1609 (or another storage medium) or transmitted by the radio frequency unit 1601 or the network module 1602. The microphone 16042 can receive a sound and can process the sound into audio data. The processed audio data may be converted in a telephone call mode into a format that can be transmitted by the radio frequency unit 1601 to a mobile communications base station, for outputting.

The terminal 1600 may further include at least one sensor 1605, for example, an optical sensor, a motion sensor, and another sensor. Specifically, the optical sensor may include an ambient light sensor and a proximity sensor. The ambient light sensor may adjust luminance of the display panel 16061 based on brightness of ambient light, and the proximity sensor may turn off the display panel 16061 and/or backlight when the terminal 1600 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 1605 may also include a fingerprint sensor, a pressure sensor, an iris sensor, a molecular sensor, a gyroscope, a barometer, a hygrometer, a thermometer, an infrared sensor, and the like. Details are not described herein.

The display unit 1606 is configured to display information input by the user or information provided to the user. The display unit 1606 may include a display panel 16061, and the display panel 16061 may be configured in a form of a liquid crystal display (LCD), an organic light-emitting diode (OLED), or the like.

The user input unit 1607 may be configured to receive input digit or character information and generate key signal input related to user setting and function control of the mobile terminal. Specifically, the user input unit 1607 may include a touch panel 16071 and other input devices 16072. The touch panel 16071, also referred to as a touchscreen, may capture a touch operation performed by the user on or near the touch panel (for example, an operation performed by the user on the touch panel 16071 or near the touch panel 16071 by using any appropriate object or accessory such as a finger or a stylus). The touch panel 16071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, transmits the point coordinates to the processor 1610, and receives and executes a command transmitted by the processor 1610. In addition, the touch panel 16071 may be implemented in a plurality of forms, for example, a resistive, capacitive, infrared, or surface acoustic wave touch panel. The user input unit 1607 may further include the other input devices 16072 in addition to the touch panel 16071. Specifically, the other input devices 16072 may include but are not limited to a physical keyboard, a function key (such as a volume control key or a power on/off key), a trackball, a mouse, a joystick, and the like. Details are not described herein.

Further, the touch panel 16071 may cover the display panel 16061. When detecting a touch operation on or near the touch panel 16071, the touch panel 16071 transmits the touch operation to the processor 1610 to determine a type of a touch event. Then, the processor 1610 provides a corresponding visual output on the display panel 16061 based on the type of the touch event. Although in FIG. 16, the touch panel 16071 and the display panel 16061 act as two independent parts to implement input and output functions of the terminal, in some embodiments, the touch panel 16071 and the display panel 16061 may be integrated to implement the input and output functions of the terminal. This is not specifically limited herein.

The interface unit 1608 is an interface between an external apparatus and the terminal 1600. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 1608 may be configured to receive an input (for example, data information or power) from an external apparatus and transmit the received input to one or more elements within the terminal 1600, or may be configured to transmit data between the terminal 1600 and the external apparatus.

The memory 1609 may be configured to store software programs and various data. The memory 1609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1609 may include a high-speed random access memory, and may further include a non-volatile memory such as a disk storage device, a flash memory device, or another volatile solid-state storage device.

The processor 1610 is a control center of the terminal, and is connected to all components of the terminal by using various interfaces and lines. By running or executing a software program and/or module that is stored in the memory 1609 and calling data stored in the memory 1609, the processor 1610 executes various functions of the terminal and processes data, so as to perform overall monitoring on the terminal. The processor 1610 may include one or more processing units. Preferably, an application processor and a modem processor may be integrated in the processor 1610. The application processor primarily processes an operating system, user interfaces, application programs, and the like. The modem processor primarily processes radio communication. It can be understood that the modem processor may alternatively be not integrated in the processor 1610.

The terminal 1600 may further include the power supply 1611 (such as a battery) supplying power to each component. Preferably, the power supply 1611 may be logically connected to the processor 1610 by using a power management system, so that functions such as charge and discharge management and power consumption management are implemented by using the power management system.

In addition, the terminal 1600 includes some functional modules that are not shown. Details are not described herein.

Preferably, an embodiment of the present invention further provides a terminal, including a processor 1610, a memory 1609, and a computer program stored in the memory 1609 and running on the processor 1610. When the computer program is executed by the processor 1610, the processes of the foregoing information reporting method embodiment can be implemented, with same technical effects achieved. To avoid repetition, details are not described herein again.

Figure 17:
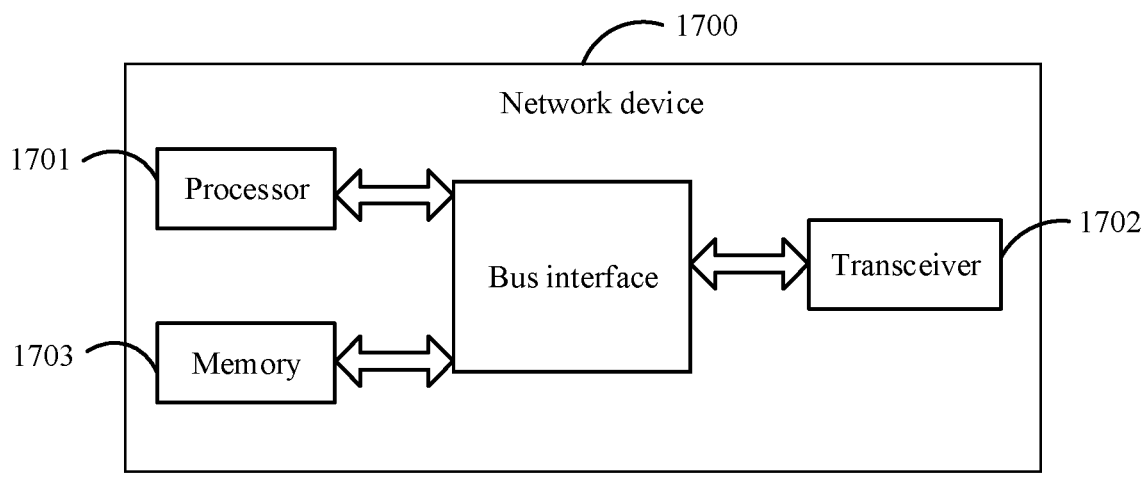
FIG. 17 is a structural diagram of another network device according to an embodiment of the present invention.

Referring to FIG. 17, FIG. 17 is a structural diagram of another network device according to an embodiment of the present invention. As shown in FIG. 17, the network device 1700 includes a processor 1701, a transceiver 1702, a memory 1703, and a bus interface.

In one embodiment,

The transceiver 1702 is configured to obtain first information, where the first information includes: at least one of a target measurement result and access state information; and the processor 1701 is configured to determine, based on the first information, an access manner for accessing the network device by a terminal, where the target measurement result is: a measurement result determined based on the measurement results of part or all of the M beams, and the access state information is information that is for indicating an access manner of accessing the network device by the terminal and that is determined based on the measurement results of part or all of the M beams; and N beams in the M beams are beams generated by the network device based on a same transmit spatial filter, M and N are integers greater than 1, and N is less than or equal to M; and the access manner is directly accessing the network device by the terminal or indirectly accessing the network device by the terminal.

Optionally, before obtaining the first information, the transceiver 1702 is further configured to:

sending configuration information, where the configuration information is used to indicate that the N beams are beams generated by the same transmit spatial filter.

Optionally, the configuration information indicates that N reference signals are reference signals with a QCL relationship, so as to implicitly indicate that the N beams are generated by the same transmit spatial filter, and the N beams are beams for sending the N reference signals; or the configuration information indicates a working time of forwarding a beam by a first node, so as to implicitly indicate that the N beams are generated by the same transmit spatial filter and the N beams are beams working during the working time for the network device, where the first node is a node for forwarding related signals of the network device.

Optionally, the target measurement result includes at least one of the following:

signal quality measurement results of the N beams and a channel correlation measurement result between the N beams.

Optionally, the determining, based on the first information, an access manner for accessing the network device by a terminal includes:

determining, based on the target measurement result, whether the N beams have a quasi co-location QCL relationship; and determining, based on whether the N beams have a QCL relationship, the access manner for accessing the network device by the terminal; where
in a case that the N beams have a QCL relationship, the access manner for accessing the network device by the terminal is directly accessing the network device; or
in a case that the N beams have no QCL relationship, the access manner for accessing the network device by the terminal is indirectly accessing the network device.

Optionally, if a channel correlation between the N beams is greater than a first threshold, the N beams have a QCL relationship; or
the signal quality measurement result implicitly indicates whether the N beams have a QCL relationship.

Optionally, in a case that the signal quality measurement result includes a combined measurement result or the target measurement result includes a measurement result determined based on the combined measurement result, the N beams have a QCL relationship, where the combined measurement result is a measurement result obtained by combining the signal quality measurement results of the N beams; and
in a case that the signal quality measurement result includes signal quality measurement results of several beams of the N beams, the N beams have no QCL relationship.

Optionally, the first information further includes at least one of the following:
indication information for indicating whether the target measurement result includes the combined measurement result;
indication information for indicating whether the target measurement result includes the measurement result determined based on the combined measurement result; and
indication information for indicating whether the N beams have a QCL relationship.

Optionally, the transceiver 1702 is further configured to:
schedule a corresponding transmission resource for the terminal based on the access manner for accessing the network device by the terminal.

Optionally, the N beams include beams whose signals are forwarded by a first node and beams whose signals are not forwarded by the first node.

In another embodiment,
the transceiver 1702 is configured to perform measurement on part or all of M beams, where N beams in the M beams are beams generated by the network device based on a same receive spatial filter, M and N are integers greater than 1, and N is less than or equal to M; and
the processor 1701 is configured to determine, based on measurement results of part or all of the M beams, an access manner for accessing the network device by a terminal; where
the access manner is directly accessing the network device by the terminal or indirectly accessing the network device by the terminal.

Optionally, measurement results of the N beams include at least one of the following:
signal quality measurement results of the N beams and a channel correlation measurement result between the N beams.

Optionally, the determining, based on measurement results of part or all of the M beams, an access manner for accessing the network device by a terminal includes:
determining, based on measurement results of the N beams, whether the N beams have a quasi co-location QCL relationship; and
determining, based on whether the N beams have a QCL relationship, the access manner for accessing the network device by the terminal.

Optionally, in a case that measurement results of the N beams include signal quality measurement results of the N beams, if a difference between the signal quality measurement results of the N beams satisfies a first condition, the N beams have a QCL relationship; or
in a case that measurement results of the N beams include a channel correlation measurement result between the N beams, if a channel correlation between the N beams is greater than a first threshold, the N beams have a QCL relationship; or
in a case that measurement results of the N beams include signal quality measurement results of the N beams and a channel correlation measurement result between the N beams, if a difference between the signal quality measurement results of the N beams satisfies a first condition and a channel correlation between the N beams is greater than a first threshold, the N beams have a QCL relationship.

Optionally, the difference between the signal quality measurement results of the N beams satisfying the first condition means:
a difference between a signal quality measurement result of a first beam in the N beams and a signal quality reference result is less than or equal to a second threshold, where the first beam is any beam with a signal quality measurement result in the N beams, and the signal quality reference result is a calculation result of the signal quality measurement results of the N beams; or
an absolute difference between a signal quality measurement result of a second beam in the N beams and a signal quality measurement result of a first beam is less than or equal to a third threshold, where the first beam is any beam with a signal quality measurement result in the N beams, the second beam is a beam whose signal is not affected by a first node in the N beams, and the first node is a node for forwarding related signals of the network device.

Optionally, the transceiver 1702 is further configured to:
schedule a corresponding transmission resource for the terminal based on the access manner for accessing the network device by the terminal.

Optionally, the N beams include beams whose signals are forwarded by a first node and beams whose signals are not forwarded by the first node.

The network device described above can determine, based on the first information, the access manner for accessing the network device by the terminal, thereby helping improve communication quality between the network device and the terminal.

The transceiver 1702 is configured to receive and send data under control of the processor 1701. The transceiver 1702 includes at least two antenna ports.

In FIG. 17, a bus architecture may include any quantity of interconnected buses and bridges, and specifically connects together circuits that are of one or more processors represented by the processor 1701 and of a memory represented by the memory 1703. The bus architecture may further interconnect various other circuits such as a peripheral device, a voltage regulator, and a power management circuit. These are all well known in the art, and therefore are not further described in this specification. The bus interface provides an interface. The transceiver 1702 may be a plurality of components, including a transmitter and a receiver, and provides units for communicating with a variety of other apparatuses on a transmission medium. For different user equipments, the user interface 1704 may also be an interface that can be externally or internally connected to a required device. The connected device includes but is not limited to a keypad, a display, a speaker, a microphone, a joystick, and the like.

The processor 1701 is responsible for management of the bus architecture and general processing, and the memory 1703 is capable of storing data that is used by the processor 1701 during operation.

Optionally, an embodiment of the present invention further provides a network device, including a processor 1701, a memory 1703, and a computer program stored in the memory 1703 and capable of running on the processor 1701. When the computer program is executed by the processor 1701, the processes of the foregoing access manner determining method embodiment can be implemented, with same technical effects achieved. To avoid repetition, details are not described herein again.

An embodiment of the present invention provides a computer-readable storage medium, where a computer program is stored in the computer-readable storage medium, and when the computer program is executed by a processor, the steps of the information reporting method provided in the embodiments of the present invention are implemented, or the steps of the access manner determining method provided in the embodiments of the present invention are implemented, with the same technical effects achieved. To avoid repetition, details are not described again herein. The computer-readable storage medium is, for example, a read-only memory (ROM), a random access memory (RAM), a magnetic disk, or an optical disc.

It should be noted that the terms "comprise", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present invention.

Some embodiments of the present invention have been described with reference to the accompanying drawings; however, the present invention is not limited to the aforesaid embodiments, and these embodiments are merely illustrative but are not intended to limit the present invention. Persons of ordinary skill in the art may further derive many other implementations according to the teachings of the present invention and within the scope defined in the claims, and all of the implementations shall fall within the scope of the present invention.

What is claimed is:

1. A terminal, comprising a memory, a processor, coupled to the memory and configured to execute the computer program to perform operations comprising:

performing measurement on part or all of M beams, wherein N beams in the M beams are beams generated by a network device based on a same transmit spatial filter, M and N are integers greater than 1, and N is less than or equal to M; and reporting first information to the network device based on measurement results of part or all of the M beams, wherein the first information comprises access state information; wherein the access state information is information that is for indicating an access manner of accessing the network device by the terminal and that is determined based on the measurement results of part or all of the M beams; and the access manner is directly accessing the network device by the terminal or indirectly accessing the network device by the terminal.

2. The terminal according to claim 1, wherein the first information further comprises a target measurement result:

wherein the target measurement result is a measurement result determined based on the measurement results of part or all of the M beams, and the target measurement result comprises at least one of the following:

signal quality measurement results of the N beams and a channel correlation measurement result between the N beams.

3. The terminal according to claim 1, wherein when the program is executed by the processor, before the step of performing measurement on the M beams to obtain the measurement results of the M beams, the following step is further implemented:

receiving configuration information, wherein the configuration information is used to indicate that the N beams are beams generated by the same transmit spatial filter.

4. The terminal according to claim 3, wherein the configuration information indicates that N reference signals are reference signals with a QCL relationship, so as to implicitly indicate that the N beams are generated by the same transmit spatial filter, and the N beams are beams for sending the N reference signals; or the configuration information indicates a working time of forwarding a beam by a first node, so as to implicitly indicate that the N beams are generated by the same transmit spatial filter and the N beams are beams working during the working time for the network device, wherein the first node is a node for forwarding related signals of the network device.

5. The terminal according to claim 1, wherein the step of reporting first information to the network device based on measurement results of part or all of the M beams comprises:

determining, based on measurement results of the N beams, whether the N beams have a quasi co-location (QCL) relationship; and reporting the first information to the network device based on whether the N beams have a QCL relationship.

6. The terminal according to claim 5, wherein in a case that measurement results of the N beams comprise signal quality measurement results of the N beams, if a difference between the signal quality measurement results of the N beams satisfies a first condition, the N beams have a QCL relationship; or
- in a case that measurement results of the N beams comprise a channel correlation measurement result between the N beams, if a channel correlation between the N beams is greater than a first threshold, the N beams have a QCL relationship; or
- in a case that measurement results of the N beams comprise signal quality measurement results of the N beams and a channel correlation measurement result between the N beams, if a difference between the signal quality measurement results of the N beams satisfies a first condition and a channel correlation between the N beams is greater than a first threshold, the N beams have a QCL relationship.

7. The terminal according to claim 6, wherein the difference between the signal quality measurement results of the N beams satisfying the first condition means:
- a difference between a signal quality measurement result of a first beam in the N beams and a signal quality reference result is less than or equal to a second threshold, wherein the first beam is any beam with a signal quality measurement result in the N beams, and the signal quality reference result is a calculation result of the signal quality measurement results of the N beams; or
- an absolute difference between a signal quality measurement result of a second beam in the N beams and a signal quality measurement result of a first beam is less than or equal to a third threshold, wherein the first beam is any beam with a signal quality measurement result in the N beams, the second beam is a beam whose signal is not affected by a first node in the N beams, and the first node is a node for forwarding related signals of the network device.

8. The terminal according to claim 5, wherein the first information further comprises a target measurement result:
- wherein the target measurement result is a measurement result determined based on the measurement results of part or all of the M beams, and in a case that measurement results of the N beams comprise signal quality measurement results of the N beams and the N beams have a QCL relationship, the target measurement result comprises a combined measurement result, or the target measurement result comprises a measurement result determined based on the combined measurement result, wherein the combined measurement result is a measurement result obtained by combining the signal quality measurement results of the N beams;
- or,
- in a case that measurement results of the N beams comprise signal quality measurement results of the N beams and the N beams have no QCL relationship, the target measurement result comprises signal quality measurement results of several beams of the N beams.

9. The terminal according to claim 8, wherein in the case that the N beams have a QCL relationship, the target measurement result comprises: top K signal quality measurement results selected from the combined measurement result and signal quality measurement results of other M-N beams, wherein K is a positive integer; or
- in the case that the N beams have no QCL relationship, the target measurement result further comprises a signal quality measurement result of at least one beam of M-N beams, wherein the signal quality measurement result of the at least one beam is a signal quality measurement result of at least one beam selected by sorting signal quality measurement results of the M-N beams; wherein
- the M-N beams are M-N beams of the network device other than the N beams.

10. The terminal according to claim 8, wherein the first information further comprises at least one of the following:
- indication information for indicating whether the target measurement result comprises the combined measurement result;
- indication information for indicating whether the target measurement result comprises the measurement result determined based on the combined measurement result; and
- indication information for indicating whether the N beams have a QCL relationship.

11. The terminal according to claim 8, wherein when the program is executed by the processor, after the step of reporting the first information to the network device based on the measurement results of the N beams, the following step is further implemented:
- in the case that the N beams have a QCL relationship, during measurement of the N beams, performing measurement on part of the N beams.

12. The terminal according to claim 5, wherein in a case that the N beams have a QCL relationship, the access state information indicates that the access manner for accessing the network device by the terminal is directly accessing the network device; or
- in a case that the N beams have no QCL relationship, the access state information indicates that the access manner for accessing the network device by the terminal is indirectly accessing the network device.

13. The terminal according to claim 1, wherein
the N beams comprise beams whose signals are forwarded by a first node and beams whose signals are not forwarded by the first node.

14. A network device, comprising a memory, a processor, coupled to the memory and configured to execute the computer program to perform operations comprising:
- obtaining first information, wherein the first information comprises access state information; and
- determining, based on the first information, an access manner for accessing the network device by a terminal, wherein
- the access state information is information that is for indicating an access manner of accessing the network device by the terminal and that is determined based on the measurement results of part or all of the M beams; and N beams in the M beams are beams generated by the network device based on a same transmit spatial filter, M and N are integers greater than 1, and N is less than or equal to M; and
- the access manner is directly accessing the network device by the terminal or indirectly accessing the network device by the terminal.

15. The network device according to claim 14, wherein when the program is executed by the processor, before the step of obtaining first information, the following step is further implemented:
- sending configuration information, wherein the configuration information is used to indicate that the N beams are beams generated by the same transmit spatial filter.

16. The network device according to claim 15, wherein the configuration information indicates that N reference signals are reference signals with a quasi co-location (QCL) relationship, so as to implicitly indicate that the N beams are generated by the same transmit spatial filter, and the N beams are beams for sending the N reference signals; or the configuration information indicates a working time of forwarding a beam by a first node, so as to implicitly indicate that the N beams are generated by the same transmit spatial filter and the N beams are beams working during the working time for the network device, wherein the first node is a node for forwarding related signals of the network device.

17. The network device according to claim 14, wherein the first information further comprises a target measurement result;

wherein the target measurement result is: a measurement result determined based on the measurement results of part or all of the M beams, and the target measurement result comprises at least one of the following:

signal quality measurement results of the N beams and a channel correlation measurement result between the N beams.

18. A network device, comprising a memory, a processor, coupled to the memory and configured to execute the computer program to perform operations comprising:

performing measurement on part or all of M beams, wherein N beams in the M beams are beams generated by the network device based on a same receive spatial filter, M and N are integers greater than 1, and N is less than or equal to M; and determining, based on measurement results of part or all of the M beams, an access manner for accessing the network device by a terminal; wherein the access manner is directly accessing the network device by the terminal or indirectly accessing the network device by the terminal.

19. The network device according to claim 18, wherein measurement results of the N beams comprise at least one of the following:

signal quality measurement results of the N beams and a channel correlation measurement result between the N beams.

20. The network device according to claim 18, wherein the step of determining, based on measurement results of part or all of the M beams, an access manner for accessing the network device by a terminal comprises:

determining, based on measurement results of the N beams, whether the N beams have a quasi co-location (QCL) relationship; and determining, based on whether the N beams have a QCL relationship, the access manner for accessing the network device by the terminal.

* * * * *